United States Patent
Afyon et al.

(10) Patent No.: US 9,911,969 B2
(45) Date of Patent: Mar. 6, 2018

(54) V2O5—LIBO2, V2O5—NIO—LIBO2 GLASSES AND THEIR COMPOSITES OBTAINED BY NITROGEN DOPING AND REDUCED GRAPHITE OXIDE BLENDING AS CATHODE ACTIVE MATERIALS

(71) Applicant: Belenos Clean Power Holding AG, Bienne (CH)

(72) Inventors: Semih Afyon, Zurich (CH); Reinhard Nesper, Amden (CH)

(73) Assignee: Belenos Clean Power Holding AG, Bienne (CH)

( * ) Notice: Subject to any disclaimer, the term of this patent is extended or adjusted under 35 U.S.C. 154(b) by 397 days.

(21) Appl. No.: 14/384,028

(22) PCT Filed: Mar. 7, 2013

(86) PCT No.: PCT/EP2013/054644
§ 371 (c)(1),
(2) Date: Sep. 9, 2014

(87) PCT Pub. No.: WO2013/132023
PCT Pub. Date: Sep. 12, 2013

(65) Prior Publication Data
US 2015/0044566 A1 Feb. 12, 2015

(30) Foreign Application Priority Data
Mar. 9, 2012 (EP) ..................................... 12158829

(51) Int. Cl.
*H01M 4/00* (2006.01)
*H01M 4/131* (2010.01)
(Continued)

(52) U.S. Cl.
CPC ............... *H01M 4/131* (2013.01); *C03C 3/14* (2013.01); *C03C 3/145* (2013.01); *C03C 21/008* (2013.01);
(Continued)

(58) Field of Classification Search
CPC .... H01M 4/131; H01M 4/0483; H01M 4/133; H01M 4/136; H01M 4/1397;
(Continued)

(56) References Cited

U.S. PATENT DOCUMENTS 3,776,745 A  12/1973 Trap
4,675,260 A   6/1987 Sakurai et al.

OTHER PUBLICATIONS

Kosacki et al., "Electrical Conductivity and Raman Scattering of Amorphous V2O5—LiBO2", 1992 Elsevier Science Publishers, p. 487-497.*

(Continued)

*Primary Examiner* — Jimmy K Vo
(74) *Attorney, Agent, or Firm* — Oblon, McClelland, Maier & Neustadt, L.L.P.

(57) ABSTRACT

An electronically active glass has the composition $(T_xO_y)_z$-$(M_uO_v)_w$—$(Na/LiBO_2)_t$ wherein
T is a transition metal selected from V and Mo,
M is a metal selected from Ni, Co, Na, Al, Mn, Cr, Cu, Fe, Ti and mixtures thereof,
x, y, u, and v are the stoichiometric coefficients resulting in a neutral compound, i.e. x=2y/(oxidation state of T) and u=2v/(oxidation state of M),
z, w and t are weight-%, wherein
z is 70-80,
w is 0-20
t is 10-30, and
the sum of z, w and t is 100 weight-%, in particular $V_2O_5$—$LiBO_2$ and $V_2O_5$—$NiO$—$LiBO_2$.

21 Claims, 21 Drawing Sheets

(51) Int. Cl.
    *C03C 3/14*     (2006.01)
    *C03C 3/145*     (2006.01)
    *C03C 21/00*     (2006.01)
    *H01M 4/58*     (2010.01)
    *H01M 4/04*     (2006.01)
    *H01M 4/136*     (2010.01)
    *H01M 4/1397*     (2010.01)
    *H01M 4/36*     (2006.01)
    *H01M 4/485*     (2010.01)
    *H01M 4/133*     (2010.01)
    *H01M 4/525*     (2010.01)
    *H01M 4/62*     (2006.01)
    *H01M 10/052*     (2010.01)

(52) U.S. Cl.
    CPC ......... *H01M 4/0483* (2013.01); *H01M 4/133* (2013.01); *H01M 4/136* (2013.01); *H01M 4/1397* (2013.01); *H01M 4/364* (2013.01); *H01M 4/485* (2013.01); *H01M 4/525* (2013.01); *H01M 4/5825* (2013.01); *H01M 4/623* (2013.01); *H01M 4/625* (2013.01); *C03C 2214/16* (2013.01); *H01M 10/052* (2013.01)

(58) Field of Classification Search
    CPC ...... H01M 4/364; H01M 4/485; H01M 4/525; H01M 4/5825; H01M 4/623; H01M 4/625; H01M 10/052

See application file for complete search history.

(56) References Cited

OTHER PUBLICATIONS

El-Desoky et al., Small polaron transport in V2O5—NiO—TeO2 glasses, 2003, Kluwer Academic Publishers, p. 215-221.*
International Search Report issued in corresponding application PCT/EP2013/054644, completed Jun. 11, 2013 and dated Jun. 20, 2013.
Khattak G.D. et al., "Structure and Electrical Properties of SrO-Borovanadate (V2O5) 0.5 (SrO) 0.5-y (B2O3)y Glasses", Journal of Physics and Chemistry of Solids, Pergamon Press, Loondon, GB vol. 70, No. 10, Oct. 1, 2009, pp. 1330-1336.
Lee Y-I et al., "Li-ion Conductivity in L12O-B2O3—V2O5 Glass System", Solid State Ionics, North Holland Pub. Company, Amsterdam; NL, NL, Col. 175, No. 1-4, Nov. 30, 2004, pp. 687-690.
Rao L. S. et al., "Dielectric Dispersion in Li2O—MoO3—B2O3 Glass System Doped With V2O5", Journal of Alloys Compounds, Elsevier Sequoia, Lausanne, CH, vol. 464, No. 1-2, Sep. 22, 2008, pp. 472-482.

* cited by examiner

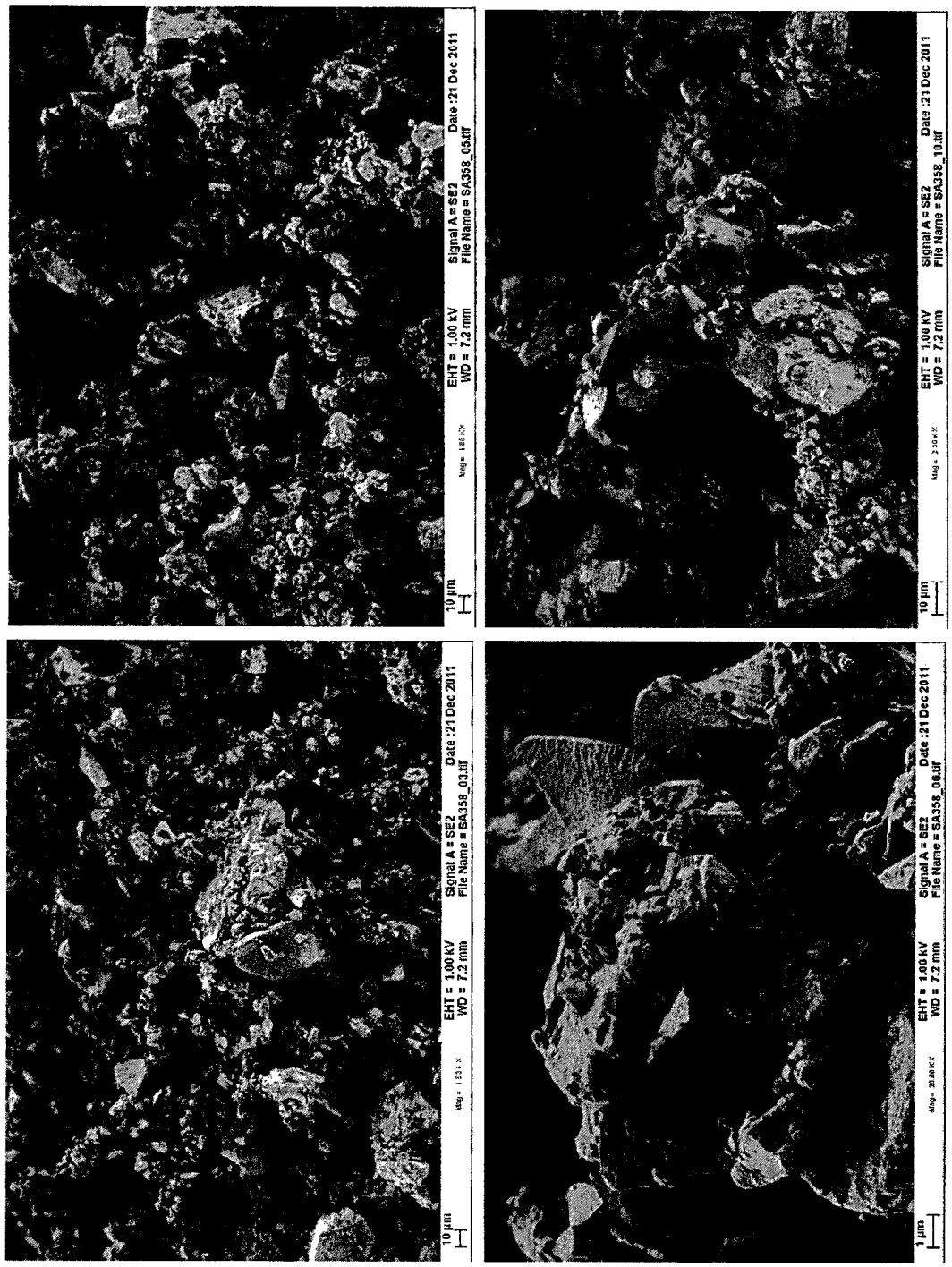
Fig. 2.1

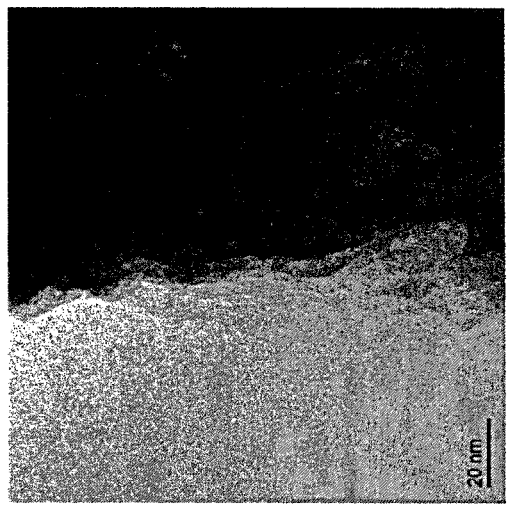
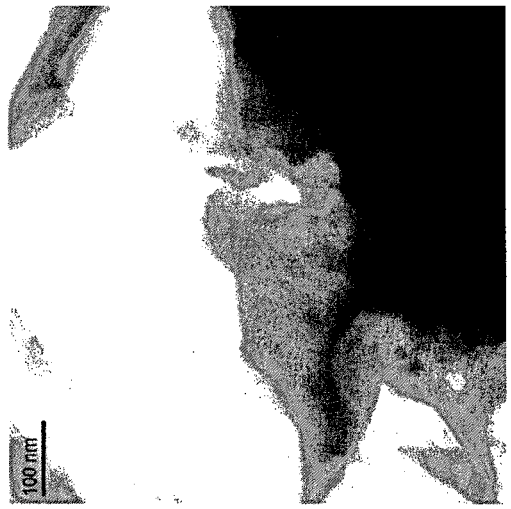
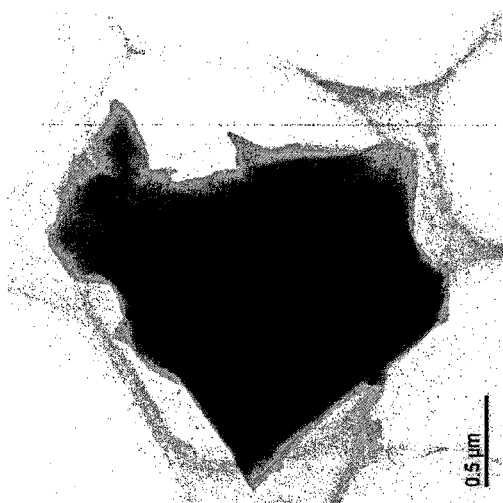
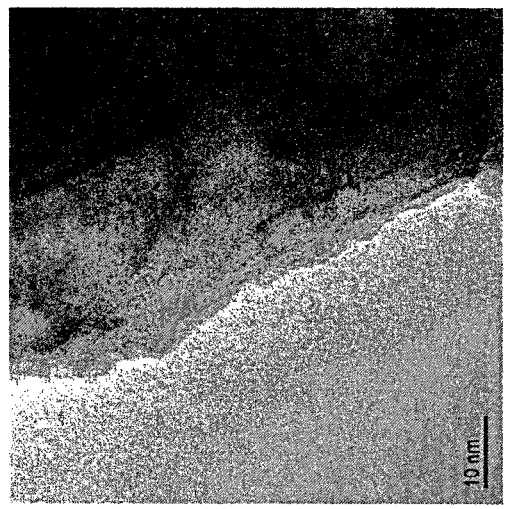
Fig. 2.2

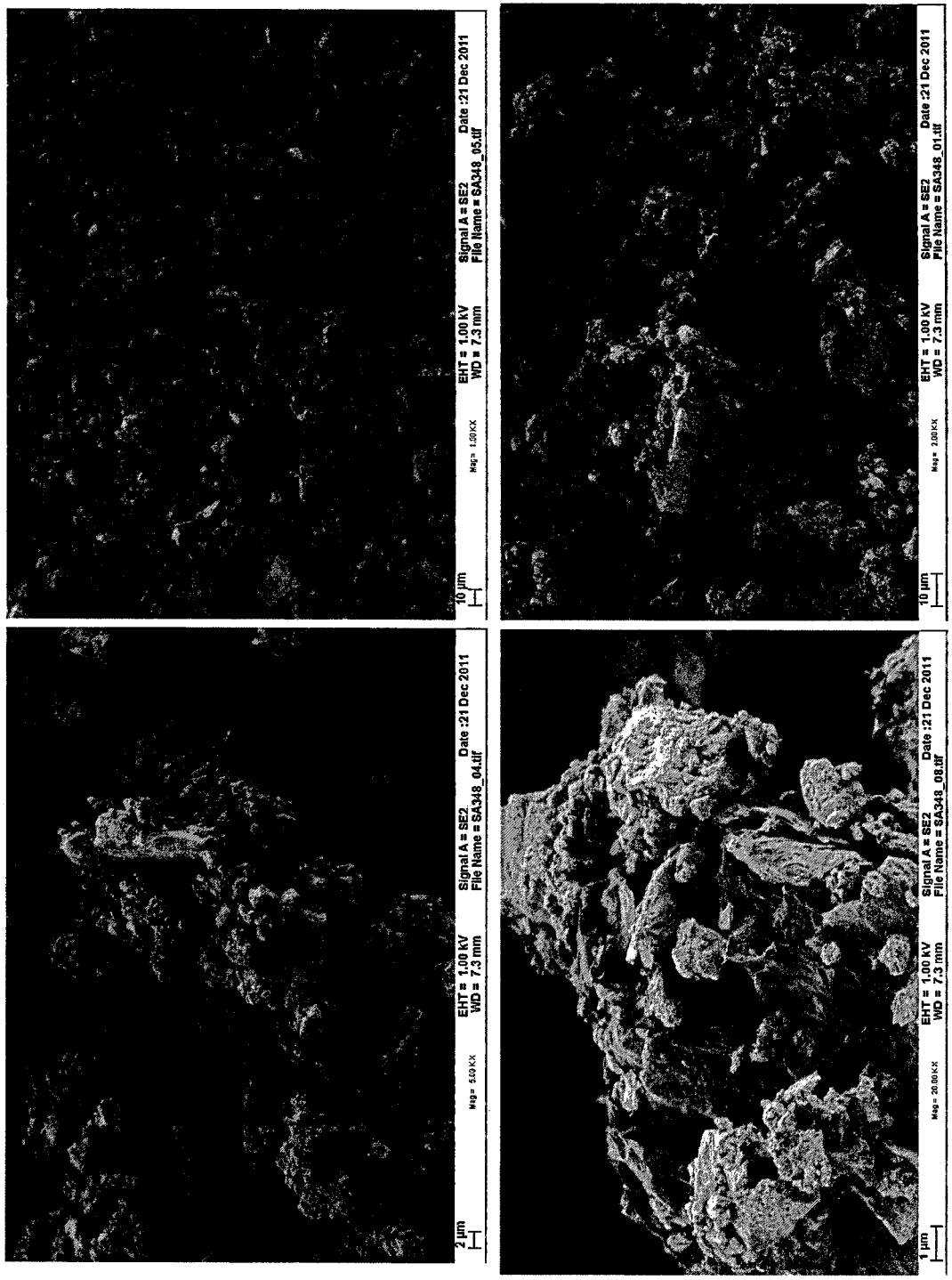
Fig. 6.1

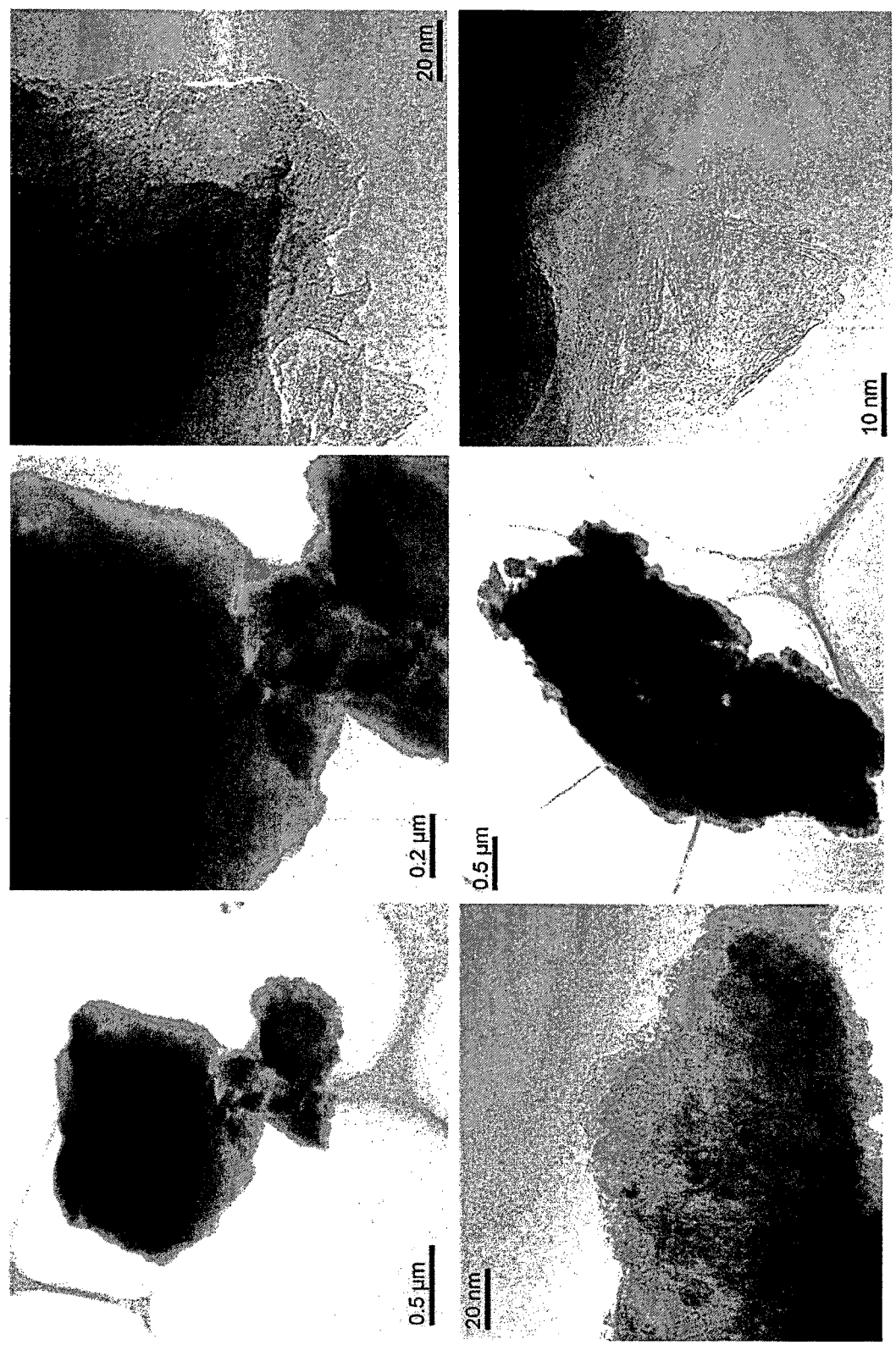
Fig. 6.2

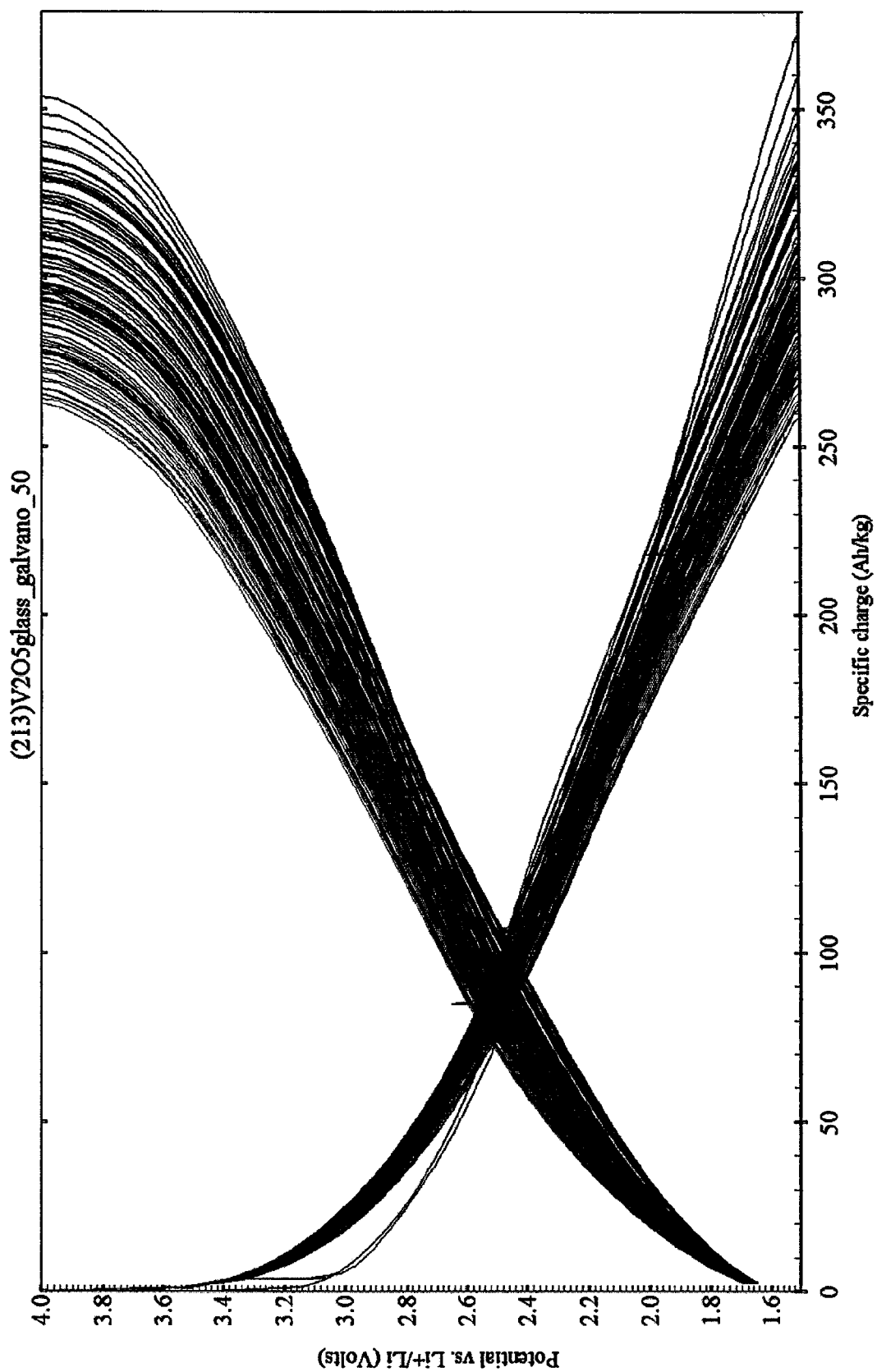
Fig. 7.1

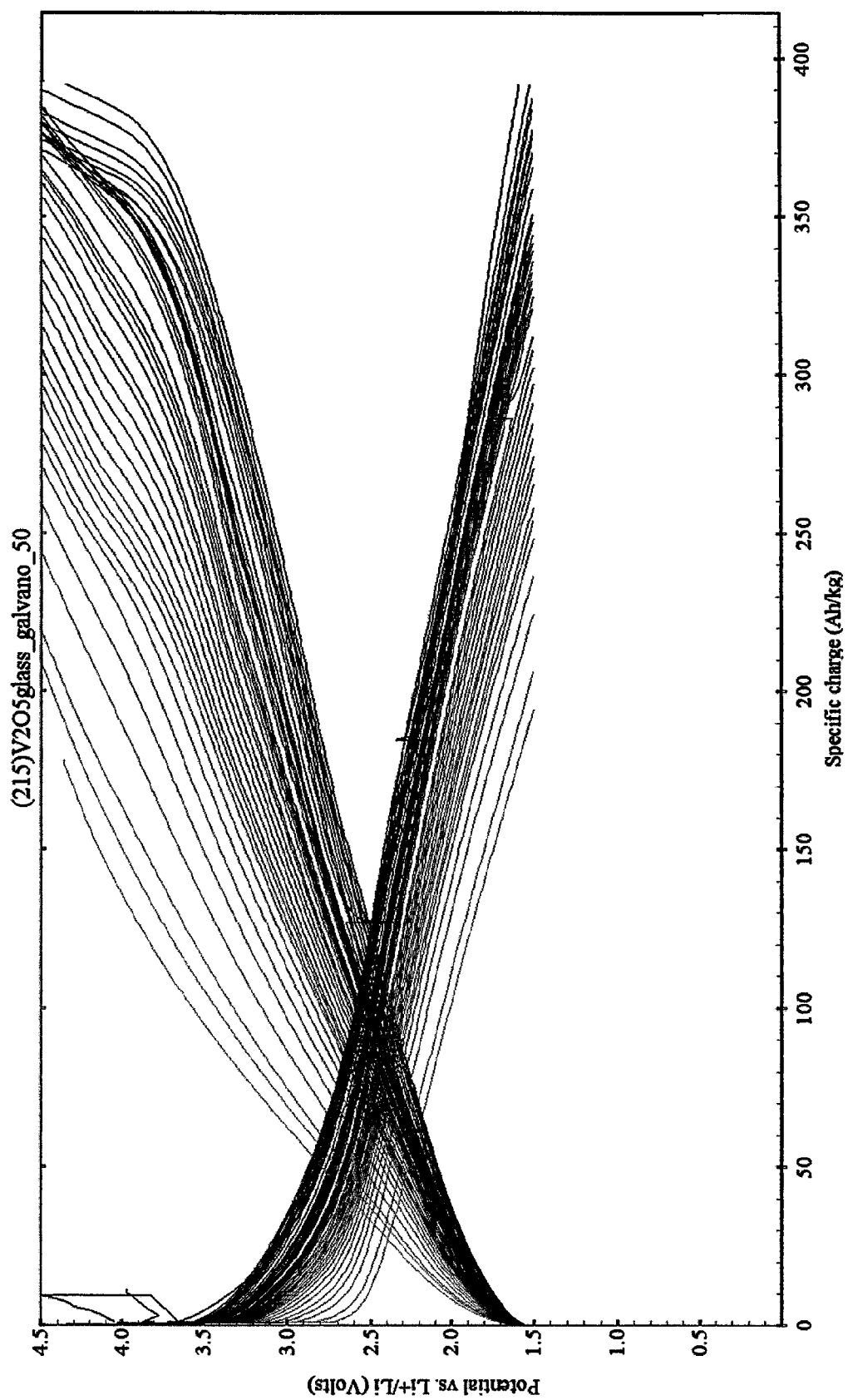
Fig. 7.2

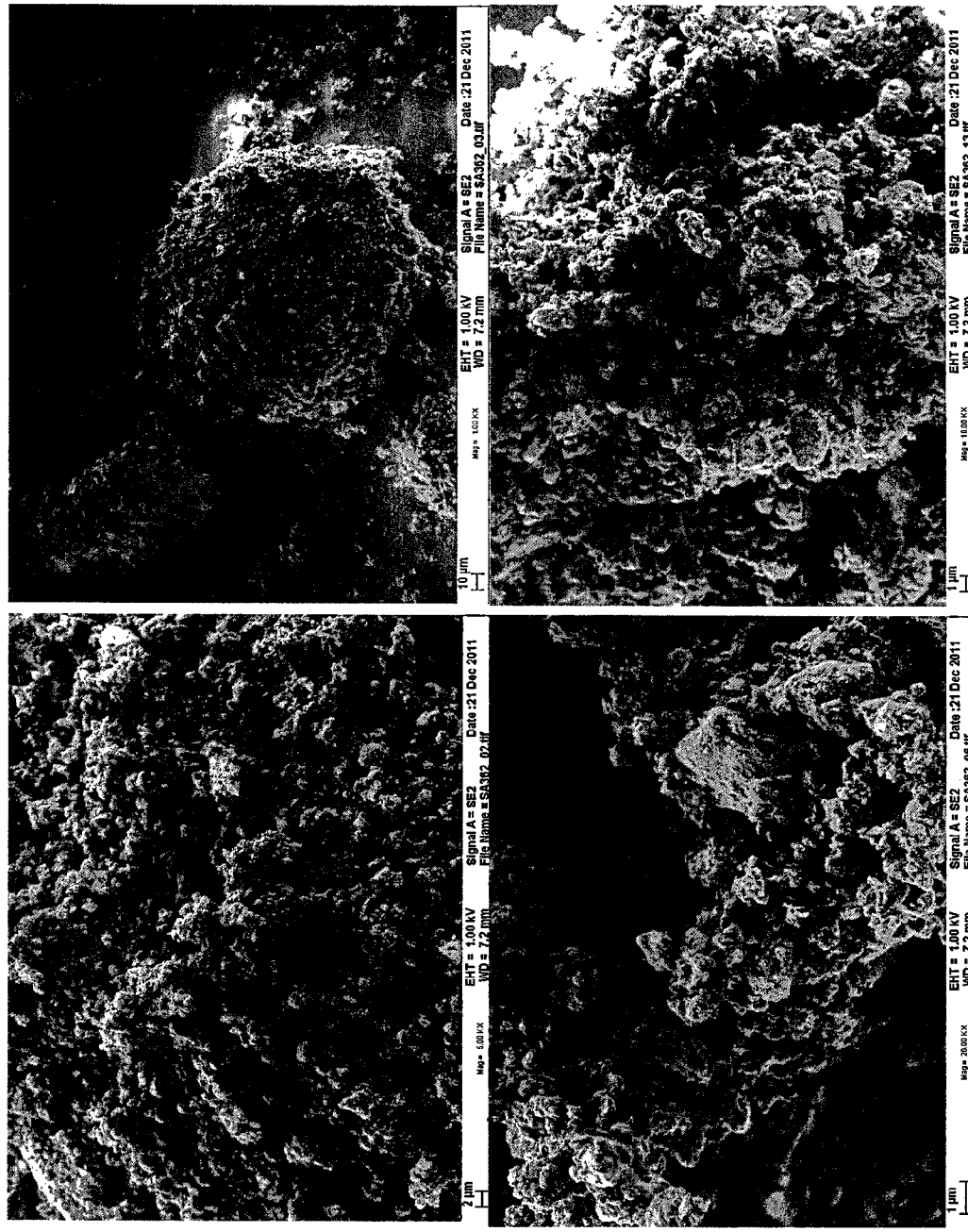
Fig. 9.1

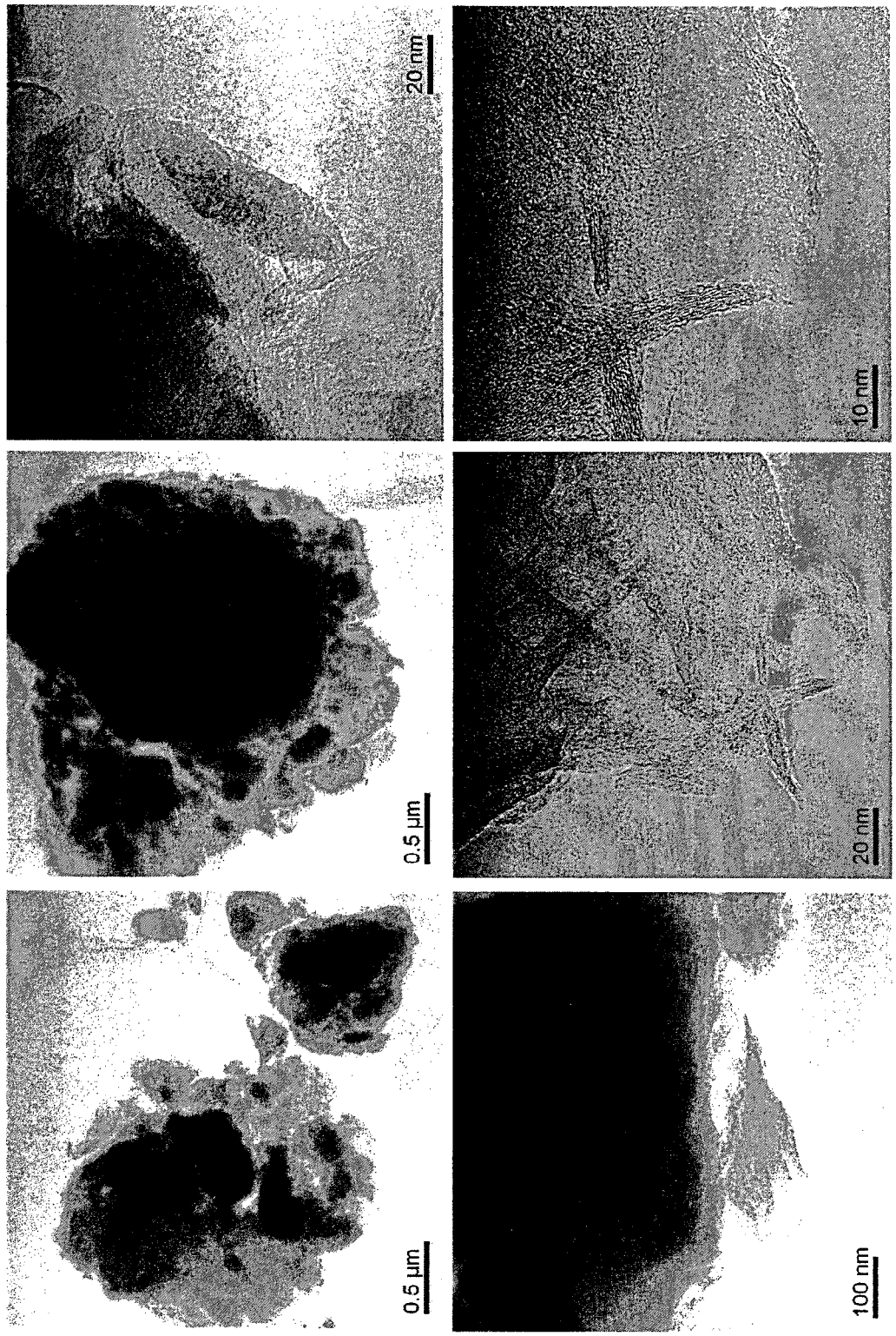
Fig. 9.2

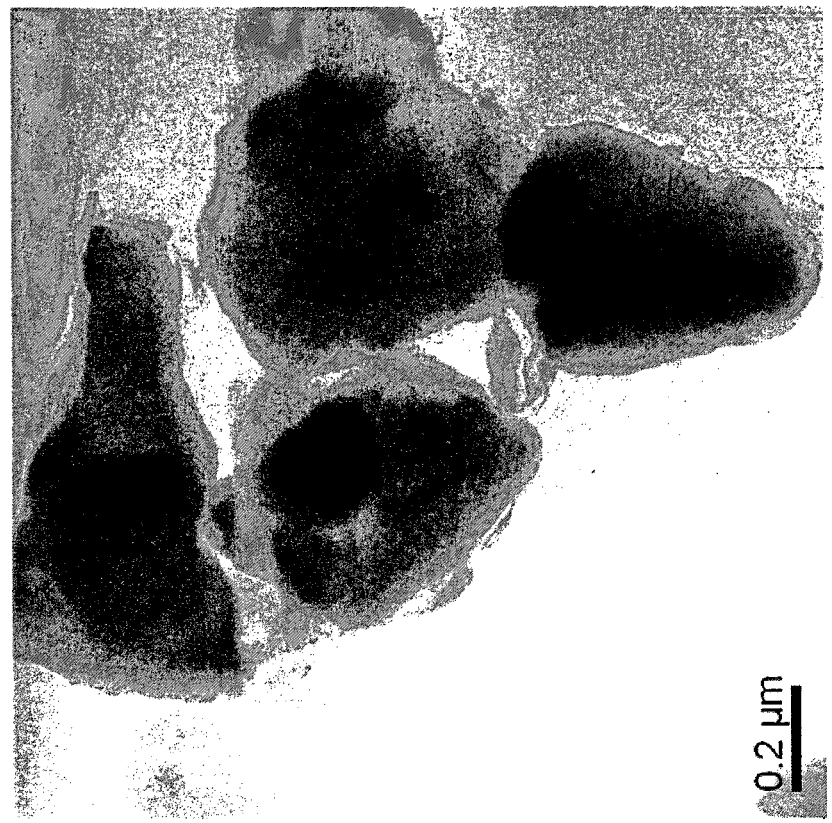
Fig. 14

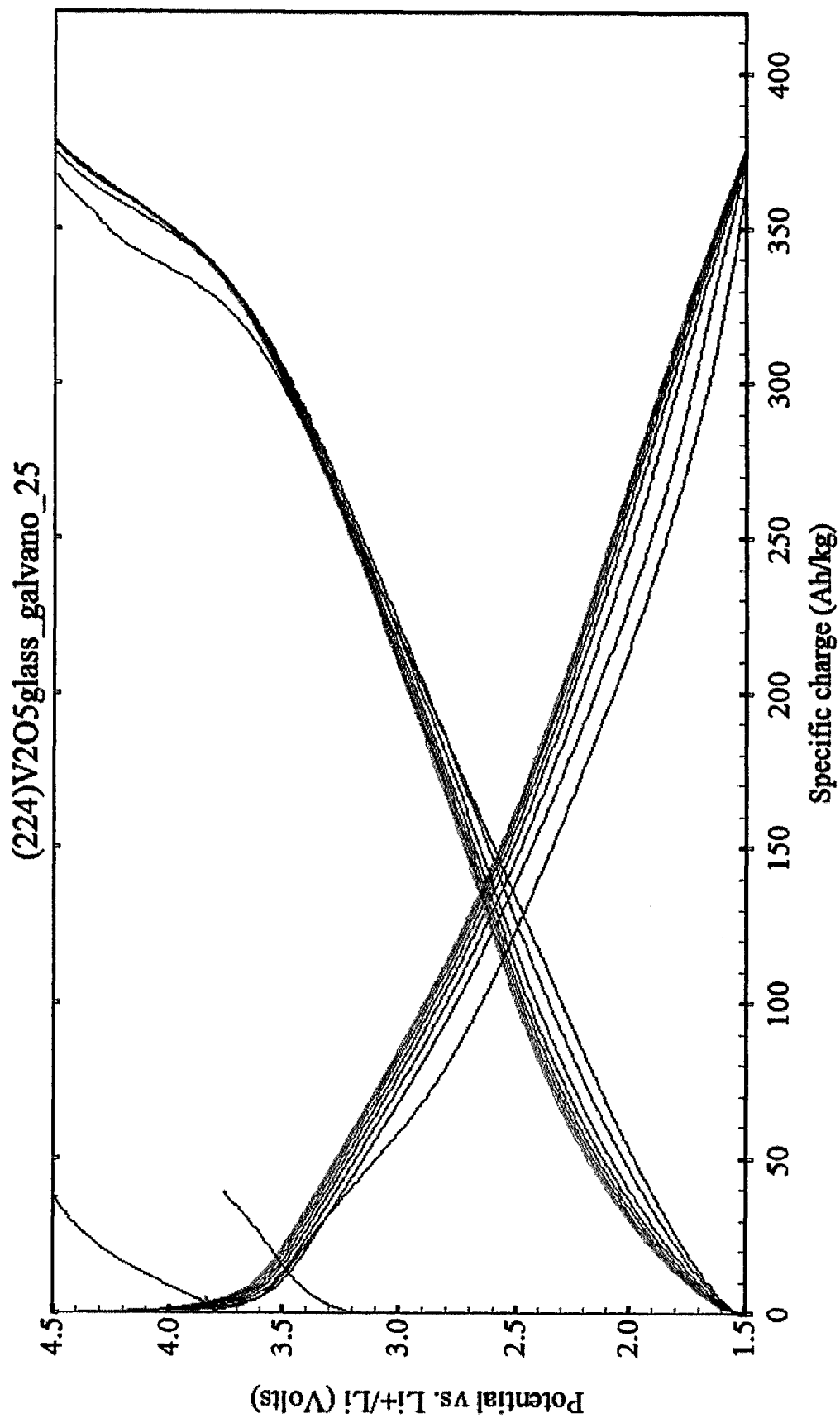
Fig. 15.1

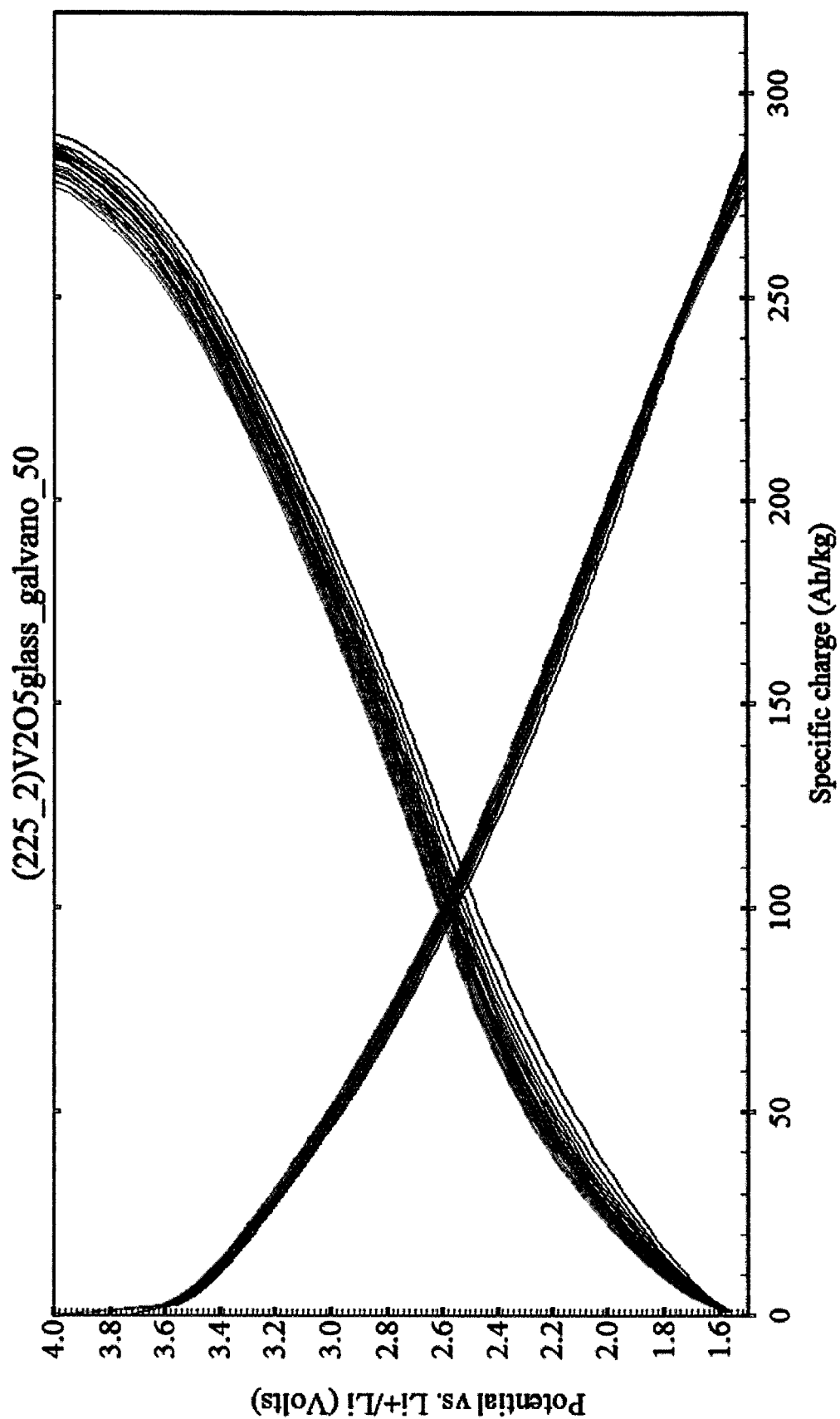
Fig. 15.2

V2O5—LIBO2, V2O5—NIO—LIBO2 GLASSES AND THEIR COMPOSITES OBTAINED BY NITROGEN DOPING AND REDUCED GRAPHITE OXIDE BLENDING AS CATHODE ACTIVE MATERIALS

CROSS REFERENCES TO RELATED APPLICATIONS

This is a National Phase Application in the United States of International Patent Application PCT/EP 2013/054644 filed Mar. 7, 2013, which claims priority on European Patent Application No. 12158829.7 of Mar. 9, 2012. The entire disclosures of the above patent applications are hereby incorporated by reference.

TECHNICAL FIELD

This invention regards glasses comprising electronically/electrochemically (later on referred to as electronically) active cathode materials, in particular such materials for use in rechargeable cells.

BACKGROUND ART

At present, Li-ion batteries have mostly $LiMO_2$ (M=Co, Ni, Mn, or combination of these transition metals) cathodes and graphite based anodes. The use of such oxide materials as cathode materials is a setback because of aspects like high cost, low stored energy density and stability. In recent years, $LiFePO_4$ was introduced as a cathode material. This material provided a major improvement and was regarded as the solution for the large scale applications of Li-ion batteries. $LiFePO_4$ operates at 3.5 V with the theoretical capacity of 170 Ah/kg. The $PO_4^{3-}$ units comprised therein are fixing oxygen in the structure thereby stabilizing the structure. Lacking stability is a problem for $LiMO_2$ cathodes acting as strong oxidizing agents for organic electrolytes. $LiFePO_4$ became a very interesting and popular material, as approx. 1000 papers were published about $LiFePO_4$ in the last five years, and a number of companies started to produce and commercialize $LiFePO_4$ and its composites. However, there is still a large energy density demand required for several applications, like for electric vehicles, and current cathode materials are away from satisfying this demand. Materials with higher specific energy and capacity need to be developed to enable e.g. the large scale use of plug-in electric vehicles.

$V_2O_5$ based compounds could be good alternatives for the current cathode materials, and there has been extensive research on $V_2O_5$ as a cathode material synthesized by various methods resulting in different morphologies and properties [1-3]. $V_2O_5$ theoretically should deliver a capacity of approx. 440 Ah/kg [2] for exchange of three lithium. However, the bulk material is limited by low ionic and electronic conductivity [4], and the major problem for both bulk and nano-$V_2O_5$ is irreversible capacity loss upon cycling.

As $V_2O_5$ partially transforms into $\omega$-phase ($Li_3V_2O_5$) upon cycling ($Li_xV_2O_5$ phases are depending on the amount of lithium inserted, $\alpha$-phase (x<0.01), $\epsilon$-phase (0.35<x<0.7), $\delta$-phase (x=1), $\gamma$-phase (1<x<3) and $\omega$-phase (x=3)) [1,2], an irreversible capacity loss occurs already in the first discharge and the theoretical capacity cannot be reached in subsequent cycles, i.e. once the $\omega$-phase is formed this phase remains even upon withdrawal of the lithium. These problems could be reduced with amorphous-glass $V_2O_5$ systems, as some researchers already tried with $V_2O_5$—$P_2O_5$ glass as a cathode material [5]. Also for boron trioxide ($B_2O_3$) based binary, ternary, quaternary $V_2O_5$ glass systems, there had been research on vibrational, mechanical, thermal and electrical properties [6-9]. However, the own experiments with boron trioxide revealed that no glass could be obtained at up to 30 wt-% $B_2O_3$. Therefore it was the aim of the present invention to provide a boron based glass comprising a low amount of glass forming material or a high amount of cationic active material, respectively.

DISCLOSURE OF THE INVENTION

Hence, it is a general object of the invention to provide a glass with low boron content that is suitable as cathode active material.

Now, in order to implement these and still further objects of the invention, which will become more readily apparent as the description proceeds, the glass is manifested by the features that it has the composition $(T_xO_y)_z$-$(M_uO_v)_w$—$(Na/LiBO_2)_t$ wherein T is a transition metal selected from V and Mo, M is a metal selected from Ni, Co, Na, Al, Mn, Cr, Cu, Fe, Ti and mixtures thereof, x, y, u, and v are the stoichiometric coefficients resulting in a neutral compound, i.e. x=2y/(oxidation state of T) and u=2v/(oxidation state of M), z, w and t are weight-%, wherein z is 70-80, w is 0-20, t is 10-30, and the sum of z, w and t is 100 weight-%.

Li/$NaBO_2$ means that the cation may be Li or Na or combination thereof.

To the inventors knowledge so far, there has been no research on glasses of the above identified type and composites comprising such glasses as cathode materials for Li-ion batteries.

In general $T_xO_y$ is selected from the group consisting of $MoO_3$ or $V_2O_5$ or mixtures thereof, and preferably is $V_2O_5$, and $M_uO_v$ is selected from the group consisting of NiO, $Co_3O_4$, $Na_2O$, $Al_2O_3$, MnO, $MnO_2$, $CrO_3$, CuO, $Ni_2O_3$, $Fe_2O_3$, $TiO_2$, etc. and mixtures thereof, wherein $Co_3O_4$ proved less good than NiO in electrochemical respect. $Na_2O$, $Al_2O_3$, MnO, $MnO_2$, $CrO_3$, CuO, $Ni_2O_3$, $Fe_2O_3$, $TiO_2$, etc. and mixtures thereof, in particular $Na_2O$ and/or $Al_2O_3$ may improve structural stability while maintaining the high specific energy and capacity.

In one embodiment w is 0. A presently preferred glass of this type is $V_2O_5$—$LiBO_2$ glass, in particular $V_2O_5$—$LiBO_2$ (80/20) glass with (80/20) designating 80 wt-% $V_2O_5$ and 20 wt-% $LiBO_2$, i.e. z is about 80, w is about 0 and t is about 20.

Another embodiment is a glass wherein z is about 80, w is about 5 and t is about 15.

In one embodiment wherein w is not 0, $M_uO_v$ is NiO or $Co_3O_4$ with NiO being preferred.

In another embodiment wherein w is not 0, $M_uO_v$ is $Na_2O$ or $Al_2O_3$.

It is also possible to prepare and use mixtures of $T_xO_y$ and/or $M_uO_v$. Mixtures of $M_uO_v$ with (i) NiO and (ii) $Na_2O$ and/or $Al_2O_3$ are preferred.

In a preferred embodiment, Li/$NaBO_2$ is $LiBO_2$.

The cycling stability may be enhanced by nitrogen doping via $Li_3N$ treatment. In case of non lithium liberating anodes like a graphite anode doping provides an additional advantage in that the glass is enriched with Li.

The glassy material of the present invention may comprise minor amounts of crystalline particles of electronically active material. These incorporated particles usually and preferably have particle sizes in the nano range, e.g. from 20 to 30 nm, while the glassy particles are in the range of 200 nm to 3 µm, preferably 200 nm to 2 µm, more preferred 200 nm to 1 µm and most preferred are in the submicron range.

An additional object of the present invention is a cathode material (composite) comprising a glass of any of the preceding claims together with carbon and/or graphite, in particular carbon and/or graphite obtained by reduction of graphite oxide, and optionally a binder.

Also an object of the present invention is a method for producing a glass as described above, said method comprising providing a composition by mixing, optionally and preferably with grinding, of z wt-% of $T_xO_y$, and w wt-% $M_uO_v$, and t wt-% $Na/LiBO_2$ and heating the mixture to a temperature where a melt is formed but preferably not over 900° C. for a time sufficient to form a homogeneous melt, such as for 1 hour, followed by fast cooling (quenching), e.g. between copper plates. For systems that tend to form paramagnetic phases at higher temperatures like the binary system $V_2O_5$—$LiBO_2$ performing the reaction at lower temperature like a temperature up to 800° C., may be favourable.

Optionally and preferably the quenching step is followed by a milling step (e.g. a ball-milling step) in order to arrive at preferred particle sizes.

Further objects of the invention are a cathode comprising the glass or the cathode material of the present invention on a current collector and a rechargeable battery comprising such a cathode as well as an anode, a diaphragm and an electrolyte.

For producing such cathode, the cathode material is slurried in a small amount of solvent, applied to the current collector and then the solvent is removed by drying. With small amount of solvent an amount is meant that is sufficient to provide a slurry suitable to be applied onto a current collector, usually an amount of about 1 to 2 ml/g glassy material, at most about 5 ml/g.

BRIEF DESCRIPTION OF THE DRAWINGS

The invention will be better understood and objects other than those set forth above will become apparent when consideration is given to the following detailed description thereof. Such description makes reference to the annexed drawings, wherein the Figures show:

FIG. 2: Electron microscope images of pulverized 80-20 wt-% $V_2O_5$—$LiBO_2$ glass with FIG. 2.1: SEM images of pulverized 80-20 wt-% $V_2O_5$—$LiBO_2$ glass.

FIG. 2.2: TEM images of 80-20 wt-% $V_2O_5$—$LiBO_2$ glass.

FIG. 6 Electron microscope images of $V_2O_5$—$LiBO_2$ glass composite material with FIG. 6.1: SEM images of the $V_2O_5$—$LiBO_2$ glass composite material.

FIG. 6.2: TEM images of the $V_2O_5$—$LiBO_2$ glass composite material.

FIG. 7: Galvanostatic measurements with

FIG. 7.1: Galvanostatic (50 A/kg rate) cycling ($0^{th}$ to $90^{th}$) of the $V_2O_5$—$LiBO_2$ glass-redGO (reduced graphite oxide) composite. The first discharge capacity is ~350 Ah/kg and reversible cycling around 300 Ah/kg (between 1.5-4.0 V) with decreases in subsequent cycles (ca. 250 Ah/kg at 90th cycle). The cycling properties and the initial discharge capacity is considerably improved compared to plain $V_2O_5$—$LiBO_2$ glass.

FIG. 7.2: Galvanostatic (25 A/kg rate) cycling ($0^{th}$ to $42^{nd}$) of the $V_2O_5$—$LiBO_2$ glass-redGO composite. The battery was first charged to 4.5 V and a capacity of 20 Ah/kg was obtained (Lithium extraction in the $1^{st}$ charge was not possible for the plain $V_2O_5$—$LiBO_2$ glass). The first discharge capacity was approx. 400 Ah/kg. Reversible cycling between 1.5-4.5 V resulted in decreases in subsequent cycles. The capacity and the voltage range dropped drastically through the $40^{th}$ cycle.

FIG. 9: Electron microscope images of the $V_2O_5$—NiO—$LiBO_2$ glass composite material wherein FIG. 9.1: SEM images of the $V_2O_5$—NiO—$LiBO_2$ glass composite material.

FIG. 9.2: TEM images of the $V_2O_5$—NiO—$LiBO_2$ glass composite material.

FIG. 14: TEM images of the nitrogen doped $V_2O_5$—NiO—$LiBO_2$ glass composite material.

FIG. 15.1: Galvanostatic cycling at a rate of 25 A/kg (0th to 10th) of the nitrogen doped $V_2O_5$—NiO—$LiBO_2$ glass composite material. OCV=3.16 V, cycling between 4.5-1.5 V. ~77 Ah/kg capacity was obtained on the $1^{st}$ charge to 4.5 V proving the chemical lithiation achieved by the reaction with $Li_3N$. The first discharge capacity was ~362 Ah/kg. Further cycling was performed between 1.5-4.5 V. At $8^{th}$ cycle the charge capacity was ~378 Ah/kg and the discharge capacity ~375 Ah/kg.

FIG. 15.2: Galvanostatic cycling at a rate of 50 A/kg (0th to 20th) of the nitrogen doped $V_2O_5$—NiO—$LiBO_2$ glass composite material. OCV=3.16 V, the first discharge capacity was ~291 Ah/kg. Further cycling was performed between 1.5-4.0 V. At $20^{th}$ cycle the charge capacity was ~277 Ah/kg and the discharge capacity ~275 Ah/kg.

MODES FOR CARRYING OUT THE INVENTION

General Remark: Wherever capacities are mentioned these capacities are for the glass composite material and would be higher when calculated only for the comprised vanadium oxide.

Example 1: $V_2O_5$—$LiBO_2$ Glass

The $V_2O_5$—$LiBO_2$ glass system is interesting because completely glassy material can be obtained with only 20 wt-% $LiBO_2$, which was not possible with $B_2O_3$ as the glass former in earlier trials. A $V_2O_5$—$LiBO_2$ glass delivering high specific capacity is shown here for the first time as well as its use as cathode material for Li-ion batteries.

Although glassy materials with more than 20 wt-% $LiBO_2$ can easily be obtained and are also within the scope of the present invention, glasses with as low as possible $LiBO_2$ content are preferred in view of maximized content of electronically active material.

Synthesis:
80-20 wt-% $V_2O_5$—$LiBO_2$ glass was obtained with a glass synthesis procedure. $V_2O_5$ and $LiBO_2$ analytical pure grade powders in corresponding amounts were thoroughly mixed and grinded in an agate mortar, and the mixtures were placed in a Pt crucible. The crucible with the material was put in a muffle furnace at 900° C., and the desired melt was obtained after 1 hour of heat treatment. The melt was quenched in air between Cu plates and $V_2O_5$—$LiBO_2$ glass was formed. Dependent on possible delays during quenching, it is also possible to obtain glass ceramics including crystallites of partially lithiated $V_2O_5$($LixV_2O_5$) or $LiV_3O_8$.

The $V_2O_5$—$LiBO_2$ glass was pulverized in an agate mortar in order to make analytical measurements. The powder had a green-brown color.

Figure 1:
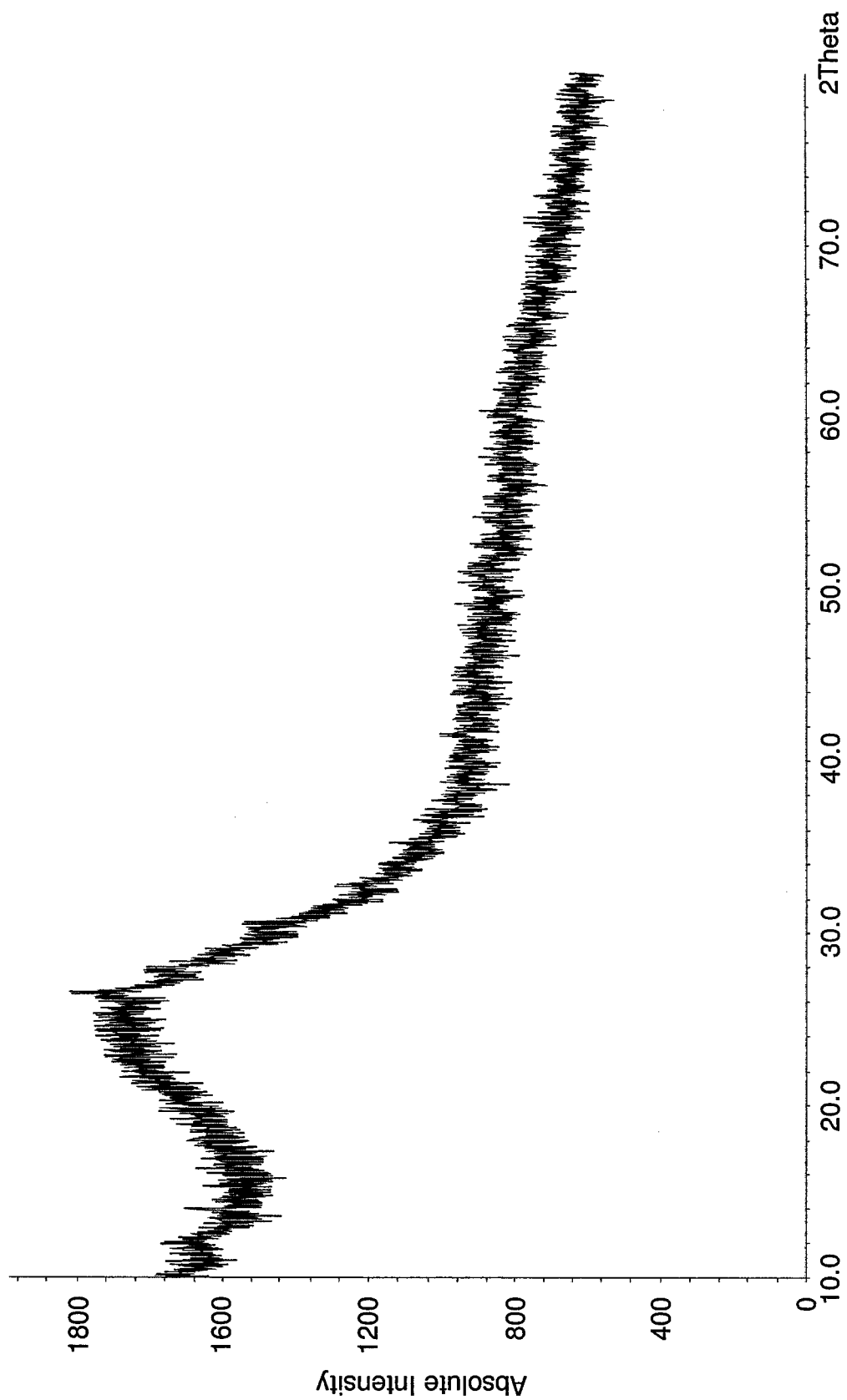
FIG. 1: XRD powder pattern of 80-20 wt-% $V_2O_5$—$LiBO_2$ glass.

Characterization:
XRD Powder Diffraction:
The XRD powder pattern of the $V_2O_5$—$LiBO_2$ glass is illustrated in FIG. 1. The product was glassy, but the diffraction peaks at 2Θ ~26.5 and 27.8 could be attributed to trace amounts of $LixV_2O_5$.

SEM-TEM:
SEM and TEM images of 80-20 wt-% $V_2O_5$—$LiBO_2$ glass are given in FIG. 2 with FIG. 2.1 being SEM images of pulverized 80-20 wt-% $V_2O_5$—$LiBO_2$ glass and FIG. 2.2 being respective TEM images. The electron microscopy images revealed that the material had mostly non-crystalline parts. But the particle sizes still were in the micron range. By milling methods, like ball milling, the particle sizes can be further reduced, preferably from the size obtained in Example 1 which is 1 to 20 microns for most particles with some large particles in the range of 40 to 50 μm to about 200 nm to 3 μm or smaller such as at most 2 μm or 1 μm. Crystalline particles that may be incorporated within the glass such as $LixV_2O_5$ usually are in the range of 20 to 30 nm.

Magnetic Measurement:
The magnetic measurements showed that 80-20 wt-% $V_2O_5$—$LiBO_2$ glass synthesized at 900° C. had paramagnetic behaviour. The paramagnetic behaviour could be attributed to the formation of lower oxidation states of vanadium at 900° C. by the loss of oxygen in the system. The glass synthesized at 700° C. had a yellowish color, whereas the one obtained at 900° C. was more greenish-brown, which is also an indication for the formation of lower oxidation state. Thus, the glass should be synthesized at temperatures below 900° C., preferably at 800° C. or less.

Figure 3:
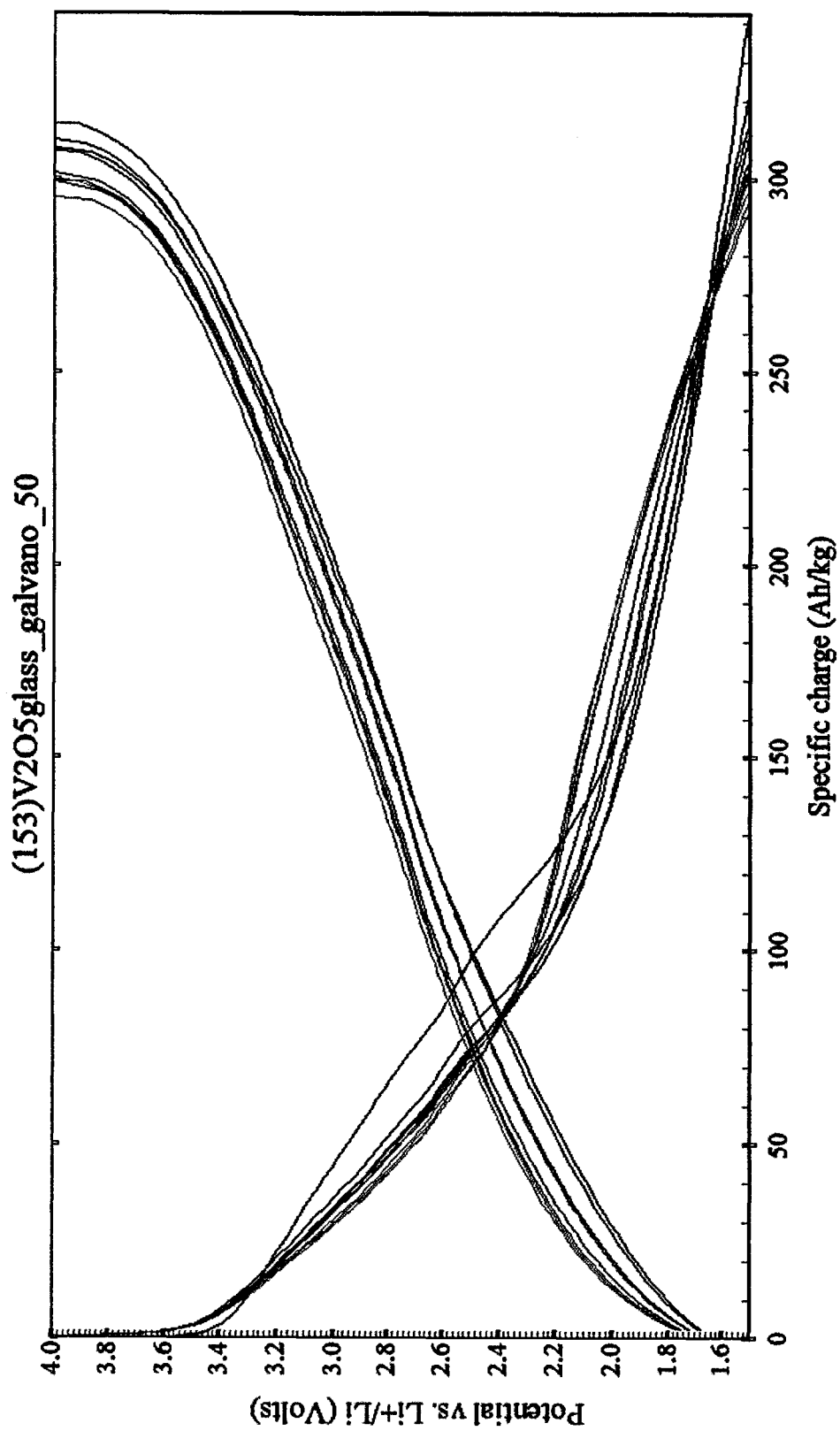
FIG. 3: Galvanostatic (50 A/kg rate) cycling (0th to 10th) of 80-20 wt-% $V_2O_5$—$LiBO_2$ glass.

Electrochemical Characterization:
The working electrode was 7:2:1 (w/w/w) $V_2O_5$—$LiBO_2$ (80/20)glass/Super P® conductive carbon/polyvinylidene fluoride (PVDF). The materials were mixed and grinded in an agate mortar and the mixture was added into a small amount of 4:1 THF:Toluene solvent mixture. With small amount an amount is meant that is sufficient to provide a slurry suitable to be applied onto a current collector, usually an amount of about 1 to 2 ml/g glassy material, at most about 5 ml/g. The slurry was spread on a titanium (Ti) current collector and dried at 85° C. for 3 hours under vacuum. The active material on the current collector was approx. 3-6 mg at the end of the process. The battery cell was constructed using lithium metal as an anode, 1 M solution of $LiPF_6$ in 1:1 ethylene carbonate/dimethyl carbonate (EC/DMC) as an electrolyte, and polypropylene film as a separator. The cells were charged-discharged with a rate of 50 A/kg between 1.5V and 4V. The galvanostatic measurement for $V_2O_5$—$LiBO_2$ glass is depicted in FIG. 3.

Example 2: $V_2O_5$—$LiBO_2$ Glass—Reduced Graphite Oxide (redGO) Composite

A composite electrode material of $V_2O_5$—$LiBO_2$ glass is obtained by the reduction of graphite oxide to graphite and amorphous carbon in a mixture of the glass and graphite oxide. The composite electrode material gives higher practical specific capacity, and the cycling is much improved compared to plain $V_2O_5$—$LiBO_2$ glass.

Synthesis:
20 wt-% graphite oxide and 80 wt-% $V_2O_5$—$LiBO_2$ were ball-milled together and the resulting mixture was heated at 200° C. for 8 hours under $N_2$ flow or in air to ensure the reduction of graphite oxide to graphite and amorphous carbon. The carbon content was found to be 10.9 wt-% at the end of the process.

Figure 4:
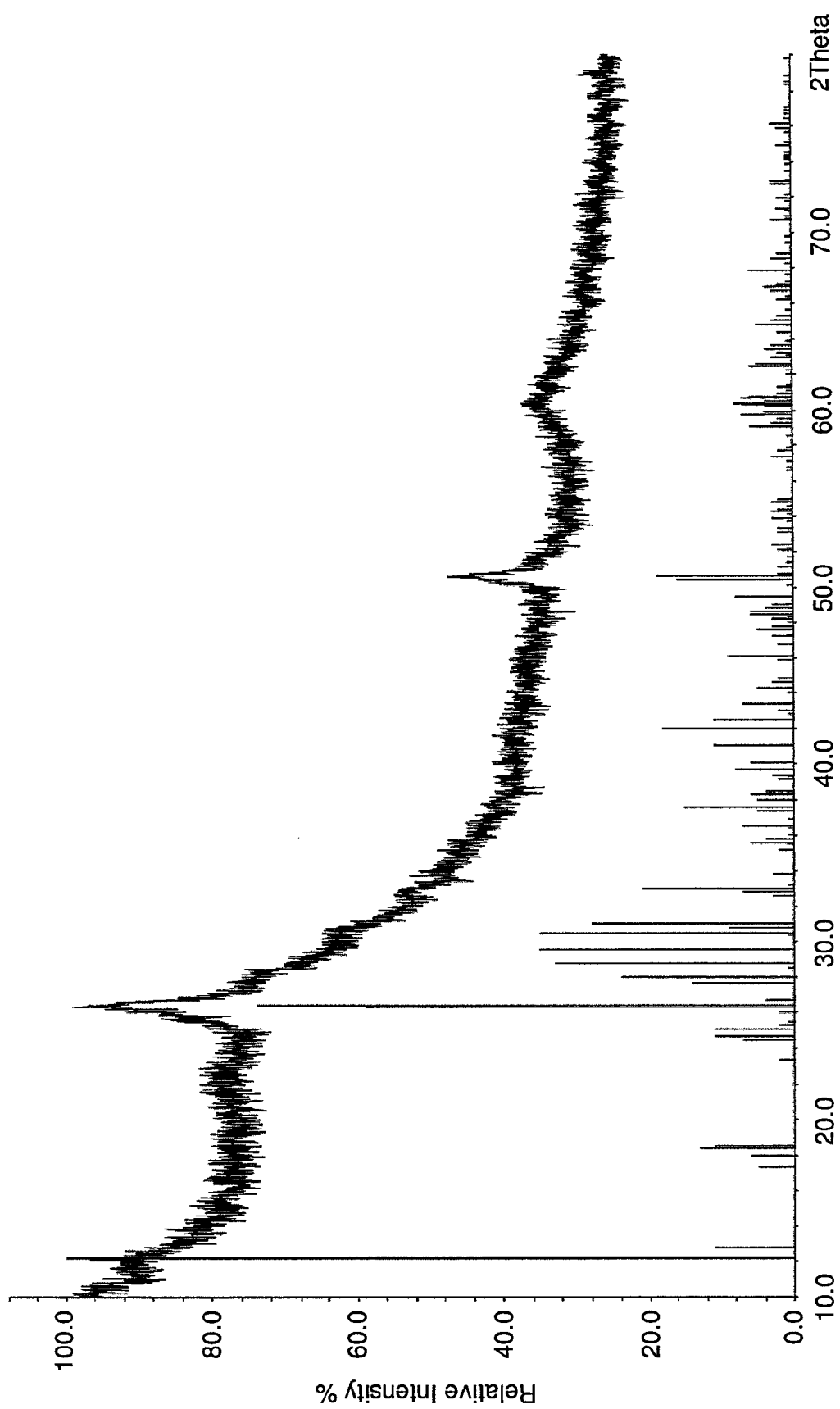
FIG. 4: XRD powder pattern of the $V_2O_5$—$LiBO_2$ glass composite material.
Figure 5:
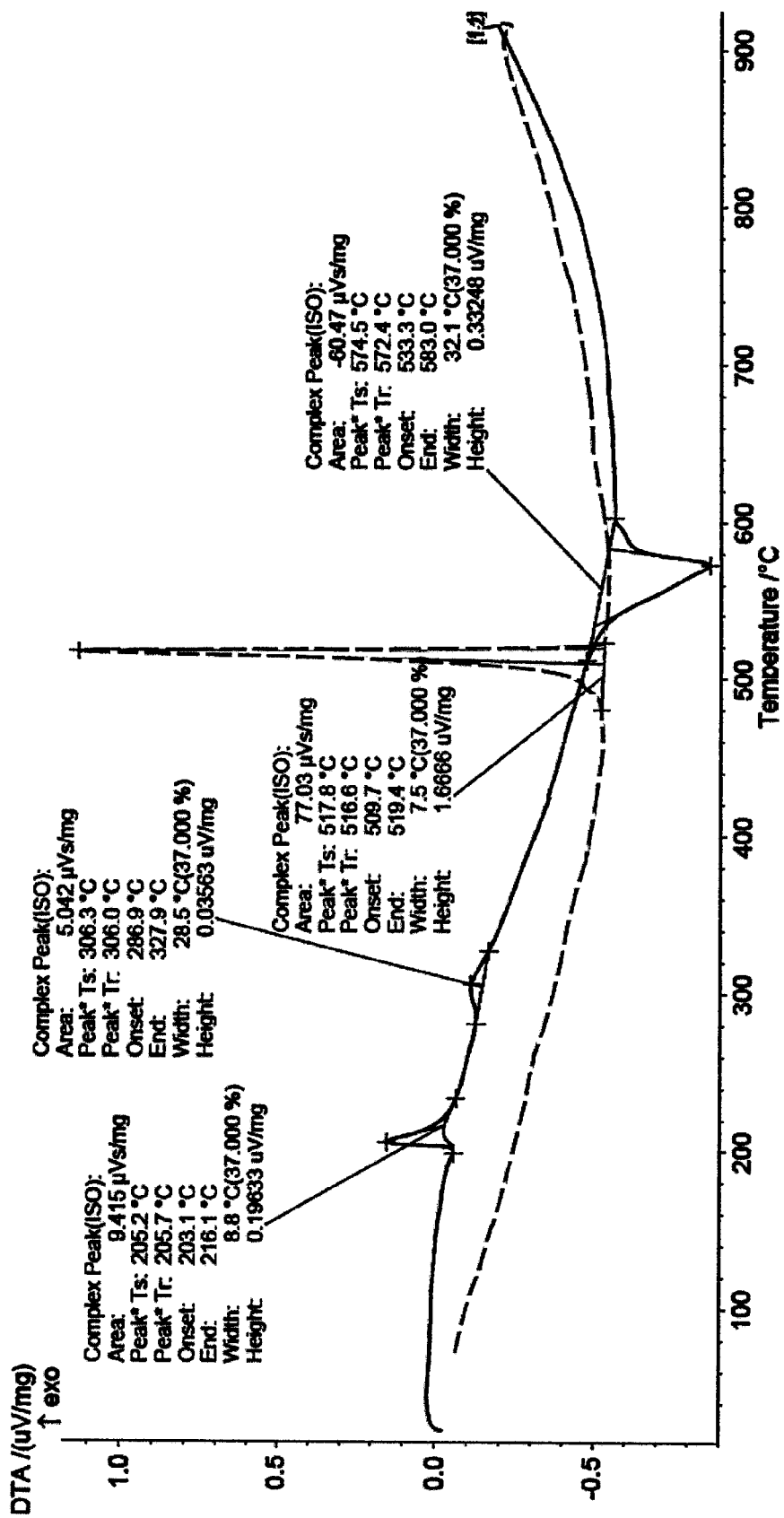
FIG. 5: Differential thermal analysis of 80-20 wt-% V2O5-LiBO2 glass.

Characterization:
XRD Powder Diffraction and DTA:
After ball-milling and heat treatment, a black powder was obtained. No diffraction peak from graphite oxide or graphite was observed. The absence of a graphite peak was attributed to the thin layers formed. The crystallinity of the material was enhanced by heat treatment with the formation of $LixV_2O_5$ phases (see FIG. 4). The formation of these phases could also be tracked by differential thermal analysis with the exothermic peak at about 200° C. (see FIG. 5).

SEM-TEM:
SEM and TEM images of the composite material are given in FIG. 6, wherein FIG. 6.1 shows SEM images of the $V_2O_5$—$LiBO_2$ glass composite material and FIG. 6.2 respective TEM images. The graphite flakes and carbon on the surface of $V_2O_5$—$LiBO_2$ can be seen in the electron microscopy images.

Electrochemical Characterization:
The working electrode used was 9:1 (w/w) composite material/polyvinylidene fluoride (PVDF), which can be also given as approx. 81 wt-% active material ($V_2O_5$—$LiBO_2$ glass), 9 wt-% conductive carbon and 10 wt-% PVDF. The materials were mixed and grinded in an agate mortar and the mixture was added into a small amount of 4:1 THF:Toluene solvent mixture. The slurry was spread on a Ti current collector and dried at 85° C. for 3 hours under vacuum. The active material on the current collector was ca. 3-6 mg at the end of the process. The battery cell was constructed using lithium metal as an anode, 1 M solution of $LiPF_6$ in 1:1 EC/DMC as an electrolyte, and polypropylene film as a separator. The cells were charged-discharged with a rate of 50 A/kg between 1.5V and 4V (or 4.5V). The galvanostatic measurement for the composite material is depicted in FIG. 7.

FIG. 7.1 illustrates galvanostatic cycling at a rate of 50 A/kg ($0^{th}$ to $90^{th}$ cycles) of the $V_2O_5$—$LiBO_2$ glass-redGO composite (redGO designates reduced graphene oxide). The first discharge capacity was approx. 350 Ah/kg and for reversible cycling (between 1.5-4.0 V) was around 300 Ah/kg with decreases in subsequent cycles (ca. 250 Ah/kg at $90^{th}$ cycle). The cycling properties and the initial discharge capacity was considerably improved compared to plain $V_2O_5$—$LiBO_2$ glass.

FIG. 7.2 illustrates galvanostatic cycling at a rate of 25 A/kg ($0^{th}$ to $42^{nd}$ cycle) of the $V_2O_5$—$LiBO_2$ glass-redGO composite. The battery was first charged to 4.5 V and a capacity of 20 Ah/kg was obtained (Lithium extraction in the $1^{st}$ charge was not possible for the plain $V_2O_5$—$LiBO_2$ glass). The first discharge capacity was about 400 Ah/kg and reversible cycling between 1.5-4.5 V resulted in decreases in subsequent cycles. The capacity and the voltage range dropped drastically through $40^{th}$ cycle.

Example 3: $V_2O_5$-$M_nO_v$—$LiBO_2$ Glass—Reduced Graphite Oxide Composite, in Particular $V_2O_5$—NiO—$LiBO_2$ Glass—Reduced Graphite Oxide Composite In order to improve the voltage range of the glass system ternary and quaternary glass systems of the inventive type, in particular $V_2O_5$ glass systems where $LiBO_2$ is used as the glass former, can be synthesized with M in $M_uO_v$ being high voltage redox couples, such as $Co^{2+}/Co^{3+}$ and $Ni^{2+}/Ni^{3+}$. As an alternative or in combination with the high voltage redox couples the structural integrity upon cycling can be improved by incorporating a compound like $Na_2O$ and/or $Al_2O_3$ as it was previously shown for NMC (nickel-mangan-cobaltoxide) materials.

$V_2O_5$—$Na_2O$—$LiBO_2$, $V_2O_5$—$Co_3O_4$—$LiBO_2$, $V_2O_5$—$Co_3O_4$—$Al_2O_3$—$LiBO_2$, and $V_2O_5$—NiO—$LiBO_2$ glasses were successfully synthesized. Among these systems, the best results so far were obtained with $V_2O_5$—NiO—$LiBO_2$. Therefore $V_2O_5$—NiO—$LiBO_2$ is further described below.

Synthesis:

80-5-15 wt-% $V_2O_5$—NiO—$LiBO_2$ glass was obtained as described before. $V_2O_5$, NiO and $LiBO_2$ analytical pure grade powders in corresponding amounts were thoroughly mixed and grinded in an agate mortar, and the mixtures were placed in a Pt crucible. The crucible with the material was put in a muffle furnace at 900° C. The melt was obtained after 1 hour of heat treatment. The melt was quenched in air between Cu plates and $V_2O_5$—$LiBO_2$ glass was formed.

To obtain the composite material, 33.3 wt-% graphite oxide and 67.7 wt-% $V_2O_5$—NiO—$LiBO_2$ glass were ball-milled together and the resulting mixture was heated at 200° C. for 8 hours in $N_2$ flow or air flow to ensure the reduction of graphite oxide to graphite and amorphous carbon. The carbon content was found to be 18.5 wt-% at the end of the process.

Figure 8:
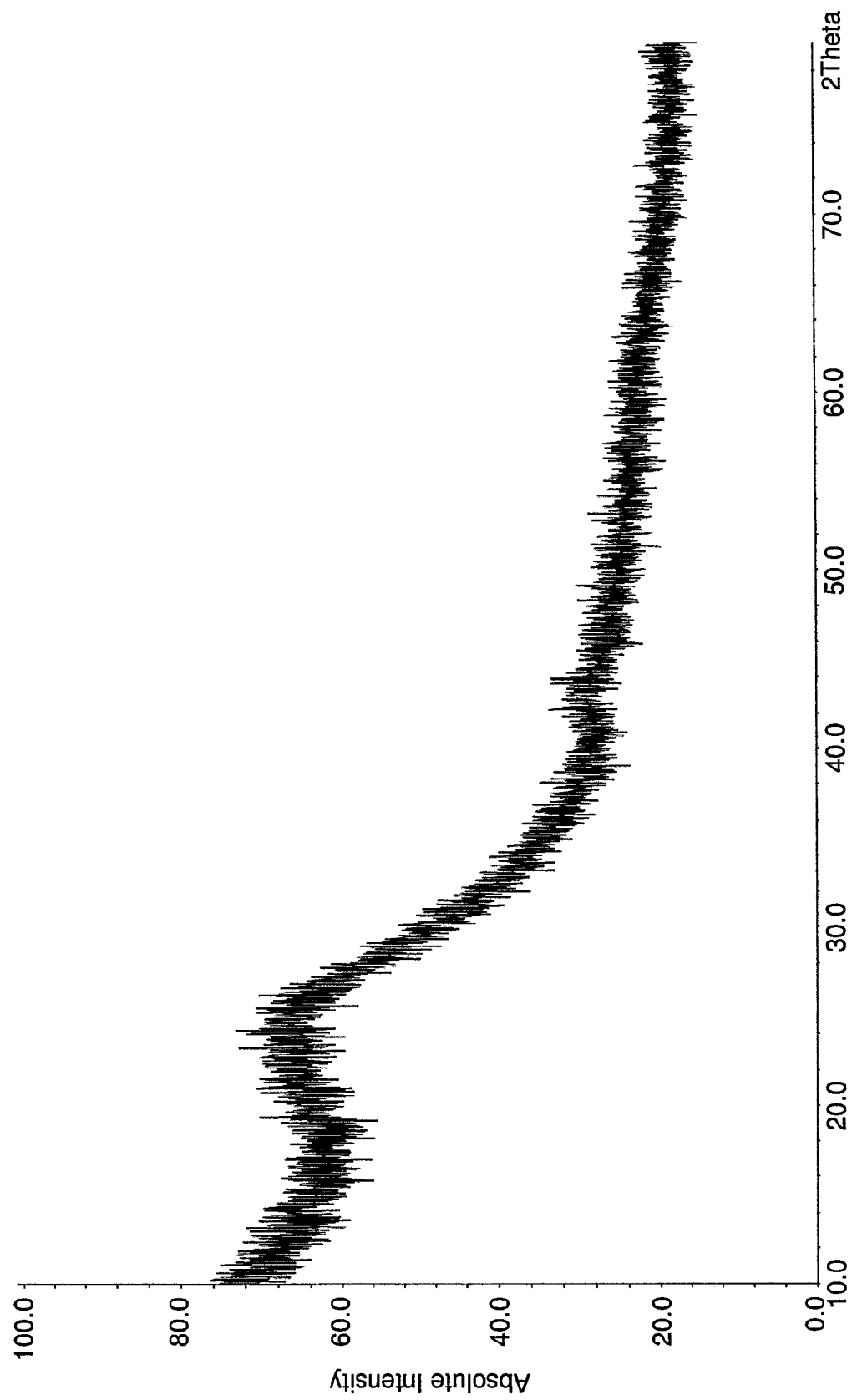
FIG. 8: XRD powder pattern of the $V_2O_5$—NiO—$LiBO_2$ glass composite material.

Characterization:

XRD Powder Diffraction:

The XRD powder pattern of the 80-5-15 wt-% $V_2O_5$—NiO—$LiBO_2$ glass composite material is illustrated in FIG. 8. Both the initial glass and the composite material obtained after treatment with graphite oxide were amorphous and differing from the $V_2O_5$—$LiBO_2$ system. No diffraction due to $Li_xV_2O_5$ phases was observed.

SEM-TEM:

SEM and TEM images of the composite material are given in FIG. 9, wherein FIG. 9.1 shows SEM images of the $V_2O_5$—NiO—$LiBO_2$ glass composite material, and FIG. 9.2 shows respective TEM images. The graphite flakes and carbon on the surface of $V_2O_5$—NiO—$LiBO_2$ glass can be seen in the electron microscopy images. The presence of nickel and vanadium are confirmed by the EDX spectrum (not shown); though the boron was not detected in the EDX spectrum due to the background, the presence can be seen in the EELS spectrum at approx. 200 eV (not shown).

Figure 10:
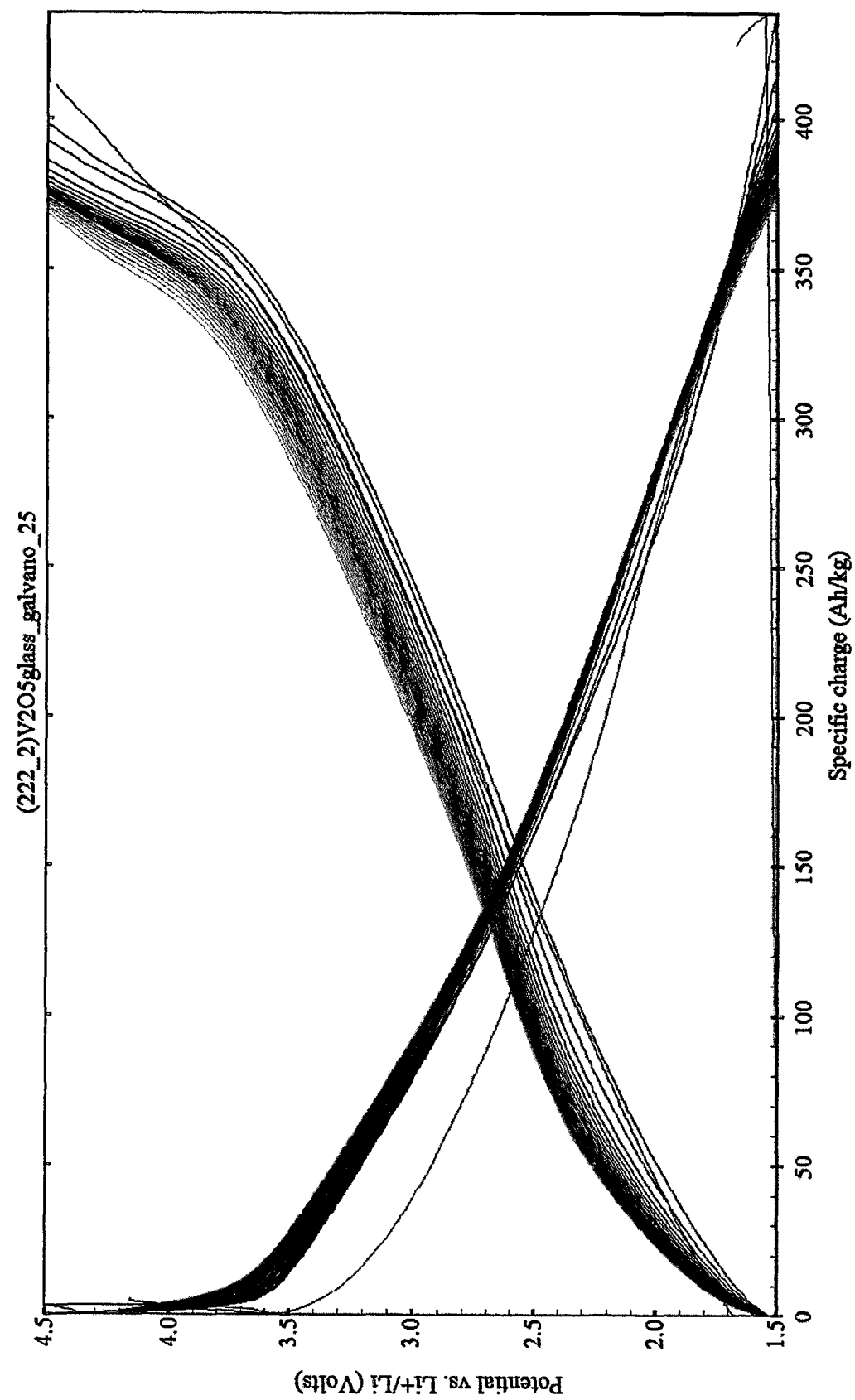
FIG. 10: Galvanostatic cycling at a rate of 25 A/kg ($0^{th}$ to $24^{th}$) of the $V_2O_5$—NiO—$LiBO_2$ glass composite material. OCV=3.50 V, cycling 4.5-1.5 V, ~8.5 Ah/kg capacity on the $1^{st}$ charge to 4.5 V, and first discharge capacity was ~435 Ah/kg. Then cycling between 1.5-4.5 V. At $20^{th}$ cycle the charge capacity was ~372 Ah/kg and the discharge capacity ~376 Ah/kg.

Electrochemical Characterization:

The working electrode used was 72.5 wt-% active material ($V_2O_5$—NiO—$LiBO_2$ glass), 17.5 wt-% conductive carbon and 10 wt-% PVDF. The materials were mixed and grinded in an agate mortar and the mixture was added into a small amount of 4:1 THF:Toluene solvent mixture (e.g. 2 ml solvent per g glass). The slurry was spread on a Ti current collector and dried at 85° C. for 3 hours under vacuum. The active material on the current collector was approx. 3-6 mg at the end of the process. The battery cell was constructed using lithium metal as an anode, 1 M solution of $LiPF_6$ in 1:1 EC/DMC as an electrolyte, and polypropylene film as a separator. The cells were charged-discharged with a rate of 50 or 25 A/kg between 1.5V and 4V (or 4.5V). The galvanostatic cycling for the $V_2O_5$—NiO—$LiBO_2$ glass composite material at a rate of 25 A/kg ($0^{th}$ to $24^{th}$ cycle) is shown in FIG. 10. OCV was 3.50 V, cycling was performed from 4.5-1.5 V, capacity on the $1^{st}$ charge to 4.5 V was ~8.5 Ah/kg, the first discharge capacity was ~435 Ah/kg. Then cycling between 1.5-4.5 V was performed. At $20^{th}$ cycle the charge capacity was ~372 Ah/kg and the discharge capacity ~376 Ah/kg.

Figure 11:
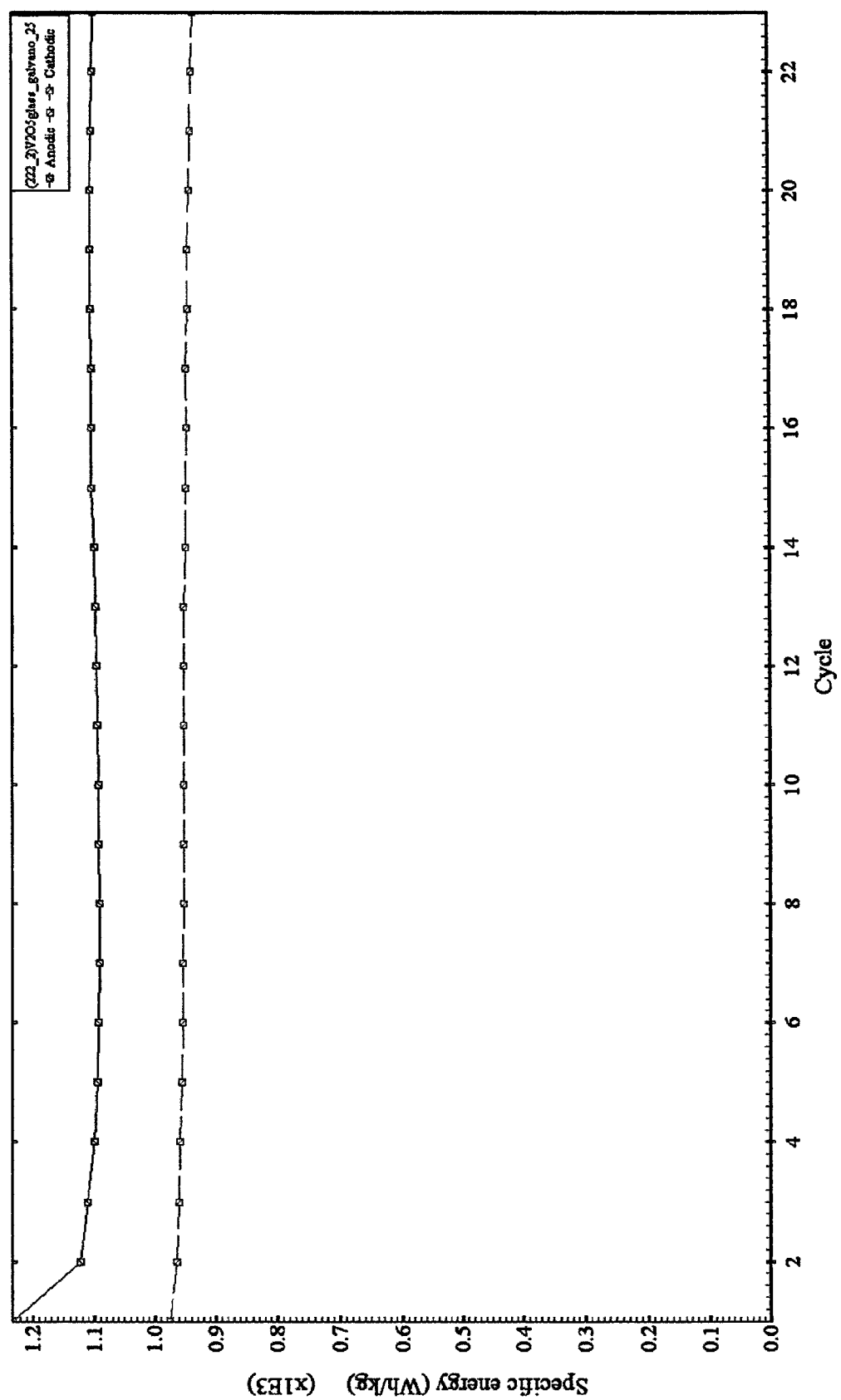
FIG. 11: Specific energy vs. cycle number plot for the $V_2O_5$—NiO—$LiBO_2$ glass composite material (cycling between 4.5-1.5 V at 25 A/kg). High specific energy with polarization at 20th cycle ~1100 Wh/kg for charge and ~950 Wh/kg for discharge. The average voltage was ~2.51V for discharge and ~2.96V for charge. These are ca. 0.3 V higher than the $V_2O_5$—$LiBO_2$ glass system indicating the contribution of NiO addition.

FIG. 11 is a plot of specific energy vs. cycle number for the $V_2O_5$—NiO—$LiBO_2$ glass composite material (cycling between 4.5-1.5 V at 25 A/kg) showing high specific energy with polarization at $20^{th}$ cycle ~1100 Wh/kg for charge and ~950 Wh/kg for discharge. The average voltage was ~2.51V for discharge and ~2.96V for charge. This is about 0.3 V higher than the $V_2O_5$—$LiBO_2$ glass system indicating the contribution of NiO addition.

Figure 12:
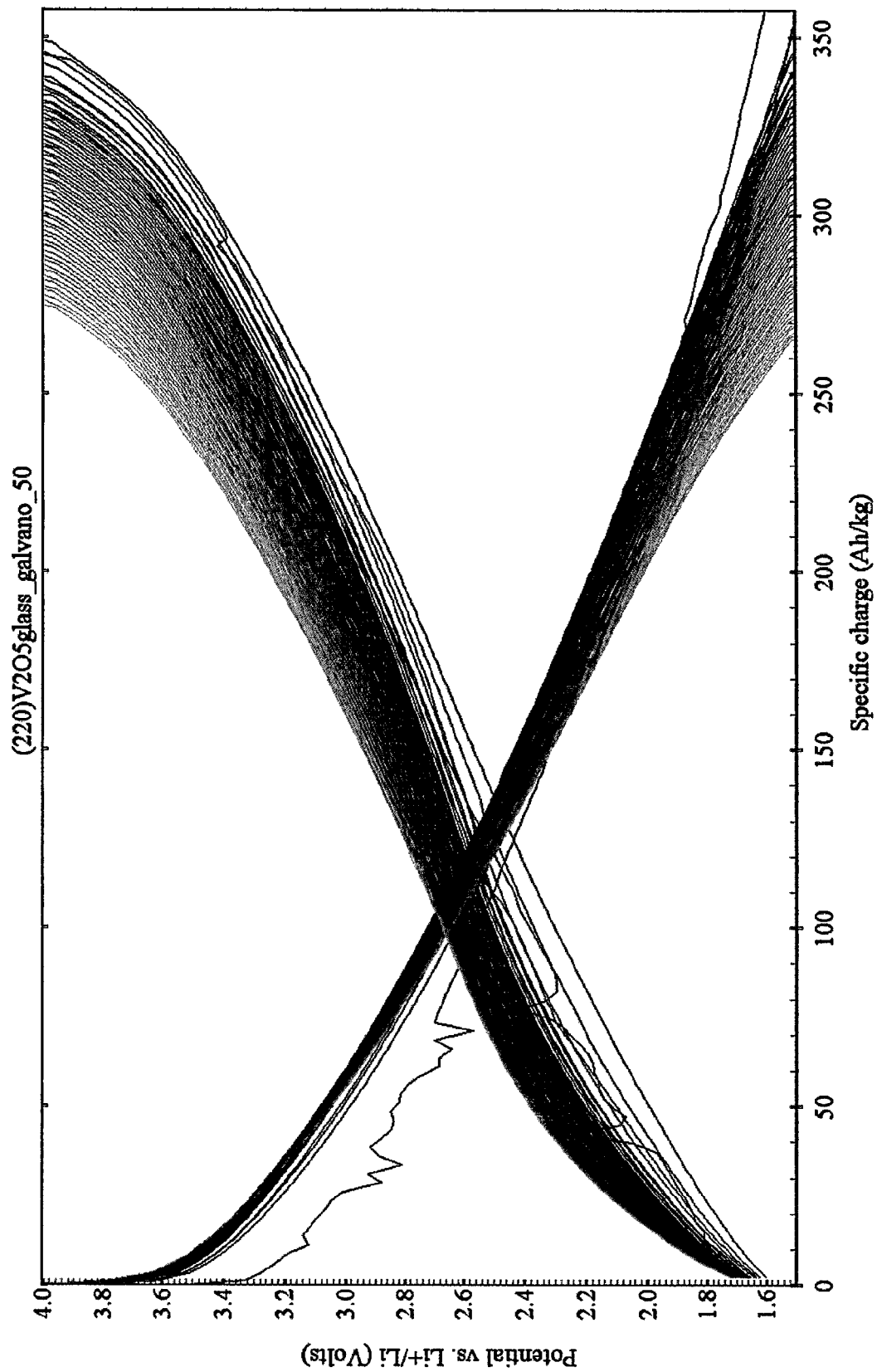
FIG. 12: Galvanostatic cycling at a rate of 50 A/kg ($0^{th}$ to $60^{th}$) of the $V_2O_5$—NiO—$LiBO_2$ glass composite material. OCV=3.51 V, in the first discharge to 1.5 V a specific capacity of ~380 Ah/kg was obtained. Then cycling was performed between 1.5-4.0 V. At $60^{th}$ cycle the charge capacity was ~275 Ah/kg and the discharge capacity ~265 Ah/kg.

FIG. 12 shows galvanostatic cycling at a rate of 50 A/kg ($0^{th}$ to $60^{th}$ cycle) of the $V_2O_5$—NiO—$LiBO_2$ glass composite material. OCV was 3.51 V, first discharge to 1.5 V resulted in a specific capacity of ~380 Ah/kg. Then cycling was performed between 1.5-4.0 V. At $60^{th}$ cycle the charge capacity was ~275 Ah/kg and the discharge capacity ~265 Ah/kg.

Example 4: N-Doped $V_2O_5$—NiO—$LiBO_2$ Glass—Reduced Graphite Oxide Composite

The performance of the $V_2O_5$—$LiBO_2$ glass systems has been improved step by step with (i) NiO doping and (ii) the composite electrode formation via graphite oxide treatment. However, the polarization and the cycling stability, though it could be considerably improved with these means, still was an object for further improvement. Nitrogen doping and chemical lithiation by the reaction of glass with $Li_3N$ was found to further decrease these problems by mainly increasing the conductivity of the system.

Below, nitrogen doping and chemical lithiation with $Li_3N$ is shown for $V_2O_5$—NiO—$LiBO_2$ glass composite material, but it can be applied to other $V_2O_5$—$LiBO_2$ glass systems as well.

Synthesis:

33.3 wt-% graphite oxide, 67.7 wt-% $V_2O_5$—NiO—$LiBO_2$ glass, and 3.3 wt-% $Li_3N$ were ball-milled together under Ar atmosphere and the resulting mixture was heated at 200° C. for 8 hours under $N_2$ flow to ensure the reduction of graphite oxide to graphite and amorphous carbon. The carbon and nitrogen content were found to be ~18.9 wt-% and ~0.45 wt-% at the end of the process by elemental analysis.

Figure 13:
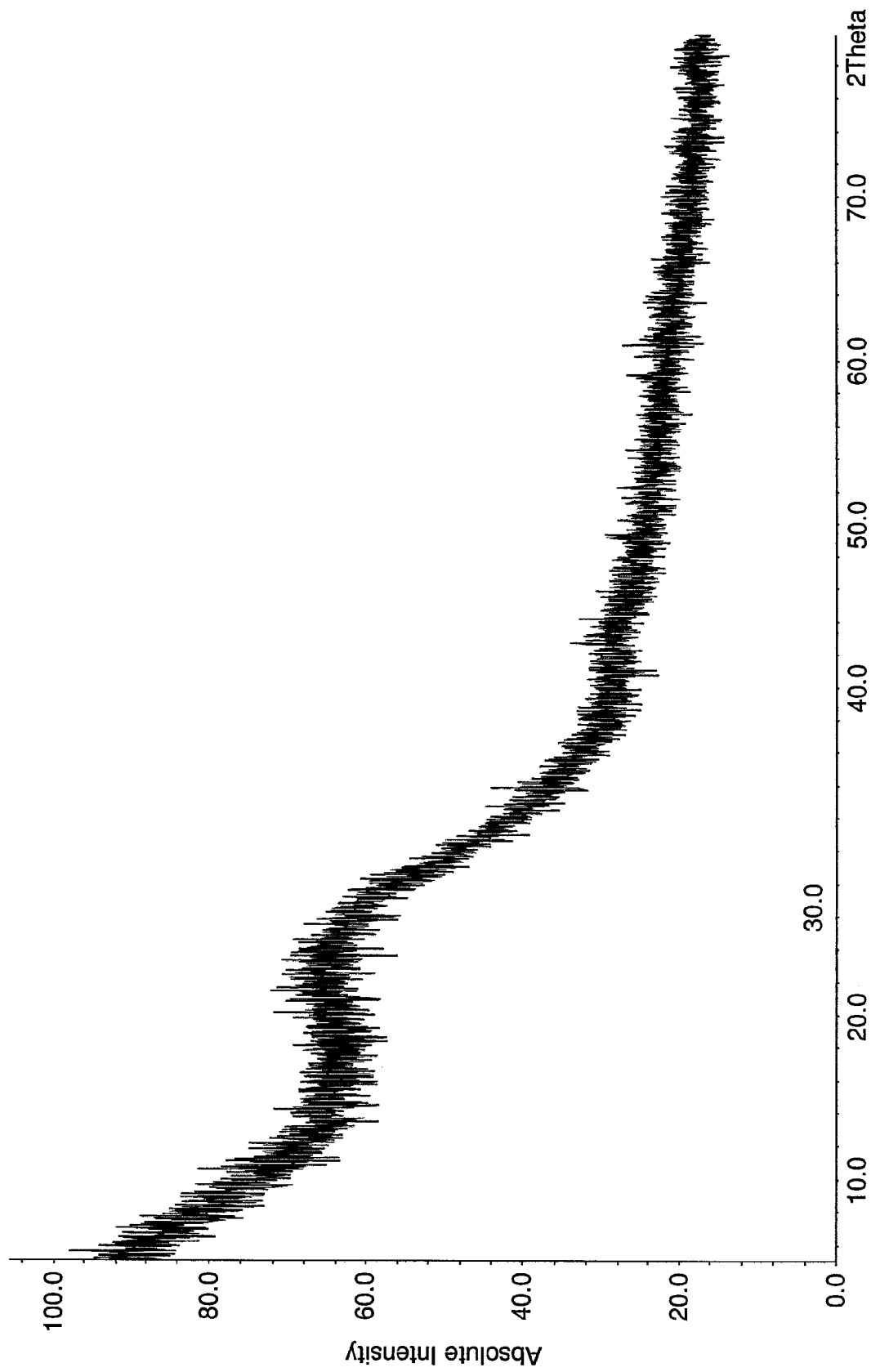
FIG. 13: XRD powder pattern of the nitrogen doped $V_2O_5$—NiO—$LiBO_2$ glass composite material.

Characterization:

XRD Powder Diffraction:

The XRD powder pattern of the nitrogen doped 80-5-15 wt-% $V_2O_5$—NiO—$LiBO_2$ glass composite material is shown in FIG. 13. The composite material obtained after treatment with graphite oxide and $Li_3N$ was amorphous, and no diffraction peaks due to graphite oxide and Li3N were observed.

TEM:

TEM images of the composite material are given in FIG. 14 showing graphite flakes and carbon on the surface of $V_2O_5$—NiO—$LiBO_2$ glass particles.

Electrochemical Characterization:

The working electrode used was 73 wt-% active material (nitrogen doped and chemically lithiated $V_2O_5$—NiO—$LiBO_2$ glass), 17 wt-% conductive carbon and 10 wt-% PVDF. The materials were mixed and grinded in an agate mortar and the mixture was added into a small amount of 4:1 THF:Toluene solvent mixture. A small amount of solvent mixture refers to an amount that makes the slurry spreadable onto the current collector and may be about 2 ml/g active material. The slurry was spread on a Ti current collector and dried at 85° C. for 3 hours under vacuum. The active material on the current collector was approx. 3-6 mg at the end of the process. The battery cell was constructed using lithium metal as an anode, 1 M solution of $LiPF_6$ in 1:1 EC/DMC as an electrolyte, and polypropylene film as a separator. The cells were charged-discharged with a rate of 50 or 25 A/kg between 1.5V and 4V (or 4.5V). The galvanostatic measurement for the composite material is depicted in FIG. 15, wherein FIG. 15.1 shows galvanostatic cycling at a rate of 25 A/kg ($0^{th}$ to $10^{th}$ cycle) of the nitrogen doped $V_2O_5$—NiO—$LiBO_2$ glass composite material and FIG. 15.2 shows galvanostatic cycling at a rate of 50 A/kg ($0^{th}$ to $20^{th}$ cycle) of the same nitrogen doped $V_2O_5$—NiO—$LiBO_2$ glass composite material.

From FIG. 15.1 the following features can be deduced: OCV=3.16 V, cycling 4.5-1.5 V, ~77 Ah/kg capacity on the $1^{st}$ charge to 4.5 V proving the chemical lithiation achieved by the reaction with $Li_3N$. The first discharge capacity was ~362 Ah/kg. Then further cycling between 1.5-4.5 V was performed. At $8^{th}$ cycle the charge capacity was ~378 Ah/kg and the discharge capacity ~375 Ah/kg.

From FIG. 15.2 the following features can be deduced: OCV=3.16 V, the first discharge capacity was ~291 Ah/kg. Then cycling was performed between 1.5-4.0 V. At the $20^{th}$ cycle the charge capacity was ~277 Ah/kg and the discharge capacity ~275 Ah/kg.

Figure 16:
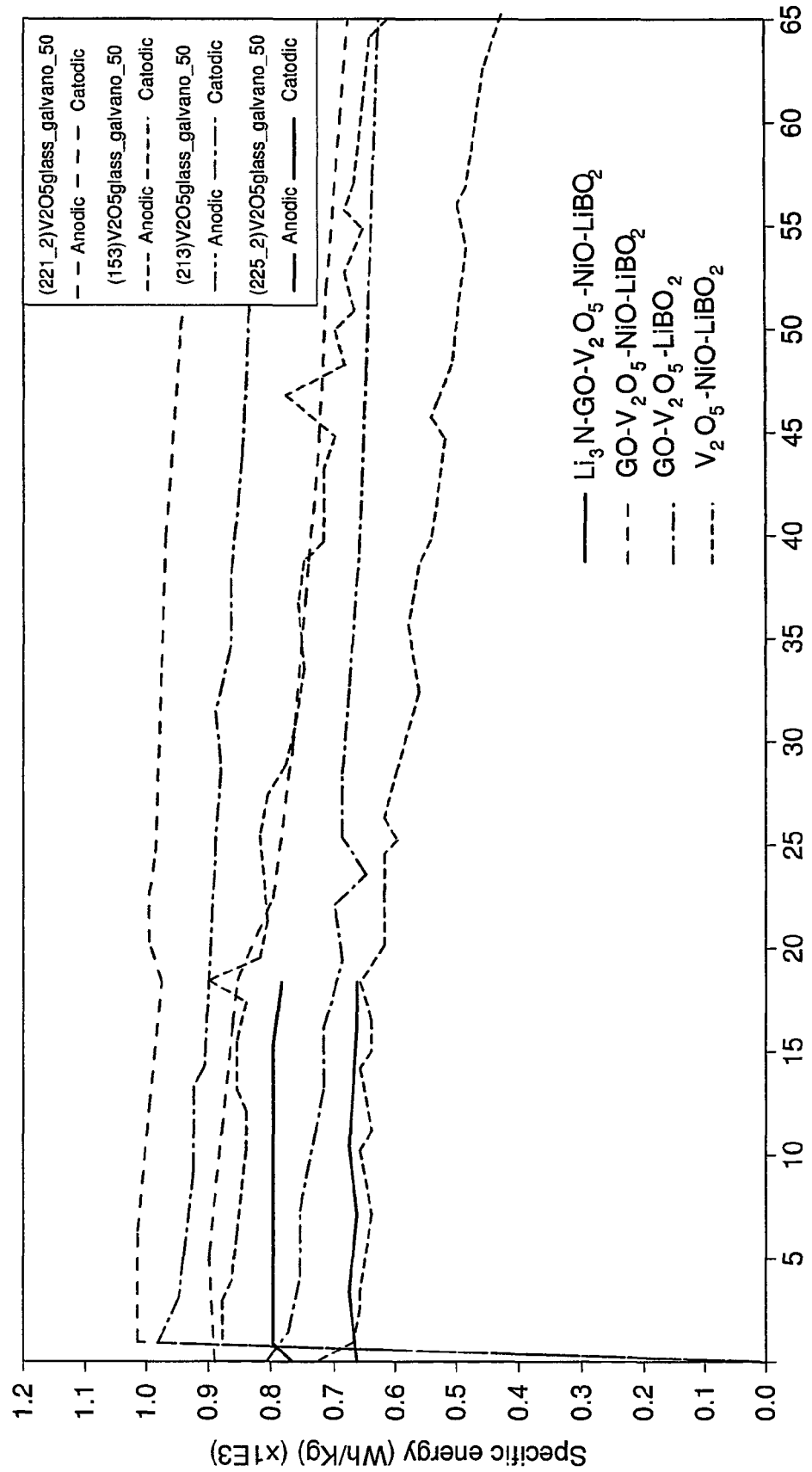
FIG. 16: Specific energy vs. cycle number plot for different glass composite materials of the present invention (cycling between. 1.5-4.0 V at 50 A/kg).

Comparison with Different Systems:

FIG. 16 shows a specific energy vs. cycle number plot for different materials of the present invention cycled between 1.5 V-4.0 V at 50 A/kg. For the nitrogen doped $V_2O_5$—NiO—$LiBO_2$ glass composite material, high specific energy was obtained with polarization at $10^{th}$ cycle ~800 Wh/kg for charge and ~675 Wh/kg for discharge and the average voltage was about 2.4 V. For non N-doped $V_2O_5$—NiO—$LiBO_2$ glass composite material, these values were ~1005 Wh/kg for charge and ~885 Wh/kg for discharge and the average voltage was about 2.4 V, so that there was a decrease in the specific capacity for the nitrogen doped sample. The values were 736 Wh/kg and 2.24V for redGO comprising $V_2O_5$—$LiBO_2$ glass, and ~647 Wh/kg and 2.23V for plain $V_2O_5$—$LiBO_2$ glass.

Advantages of the Glassy Composite Materials of the Present Invention:

The inventive materials, wherein Li/$NaBO_2$ acts as the glass former and $T_xO_y$, in particular $V_2O_5$ as the main electrochemically active part and that have high specific capacity and energy are suitable electronically active materials for Li-ion batteries. One of their advantages is that the synthesis method is very simple and cost efficient. Comparable cathode materials delivering close capacities and energies are only obtainable by laborious synthetic methods and using expensive techniques and educts. The specific advantages of important embodiments of the invention can be described as follows:

$V_2O_5$—$LiBO_2$ Glass:

The completely glassy material is obtained with only 20 wt-% $LiBO_2$ meaning that the major part of the glass still is electrochemically active. Irreversible capacity loss that occurs for 3 lithium insertion in crystalline $V_2O_5$ phases is not found in this glass as the system cycles as a solid solution and there is no phase transformation in the first discharge.

$V_2O_5$—$LiBO_2$ Glass—Reduced Graphite Oxide (redGO) Composite:

The cycling properties and charge/discharge capacities of the $V_2O_5$—$LiBO_2$ glass is improved by a better conducting carbon network obtained via reduction of well distributed graphite oxide. Besides, excess Li in the initial glass could be partially extracted in the first charge, which was not possible using plain $V_2O_5$—$LiBO_2$ glass where Li remained therein as "dead weight".

$V_2O_5$—NiO—$LiBO_2$ Glass—Reduced Graphite Oxide (redGO) Composite:

NiO addition into the system increased the voltage range and so the specific energy of the system. In addition, the cycling in the broader voltage range, 4.5V-1.5V was advanced compared to the plain system ($V_2O_5$—$LiBO_2$ glass). Though it was not tested, the thermal stability of the system is also thought to be improved.

N-Doped $V_2O_5$—NiO—$LiBO_2$ Glass—Reduced Graphite Oxide (redGO) Composite:

The cycling stability and the columbic efficiency (when cycled between 1.5-4.0 V) were increased by nitrogen doping via the reaction with $Li_3N$. In addition, the glass can be lithiated by this method, which is advantageous or even necessary for the commercial use if the anode part of the battery is chosen from a non lithiated material, such as graphite.

In order to specifically examine the features of the glassy material, the glass particles examined above were not provided with a coating. However, using special coatings on the surface of the glass particles, such as C, $ZrO_2$, $Al_2O_3$, $Li_3PO_4$, $LiFePO_4$, $Li_3BO_3$ etc. is within the scope of the present invention. Such coatings may e.g. further improve stability since a main reason for stability problems is assumed to be the dissolution of the transition metal centers into the electrolyte.

Further improvement is obtainable through optimization of the particle sizes of the inventive glasses, since those examined above were still in the μm range. Big particle size of materials with low ionic conductivity is assumed to be the main reason for the large hysteresis of approx. 100-150 Wh/kg, observed.

While there are shown and described presently preferred embodiments of the invention, it is to be distinctly understood that the invention is not limited thereto but may be otherwise variously embodied and practiced within the scope of the following claims.

REFERENCES

[1] C. Delmas, H. Cognac-Auradou, J. M. Cocciantelli, M. Menetrier, J. P. Doumerc, "$Li_xV_2O_5$ system: An overview of the structure modifications induced by the lithium intercalation", *Solid State Ionics* 69, 257-264 (1994)

[2] A. M. Glushenkov, M. F. Hassan, V. I. Stukachev, Z. Guo, H. K. Liu, G. G. Kuvshinov, Y. Chen, "Growth of $V_2O_5$ nanorods from ball-milled powders and their performance in cathodes and anodes of lithium-ion batteries", *J Solid State Electrochem* 14, 1841-1846 (2010)

[3] D. A. Semenenko, D. M. Itkis, E A. Pomerantseva, E. A. Goodilin, T. L. Kulova, A. M. Skundin, Y. D. Tretyakov, "$LiV_2O_5$ nanobelts for high capacity lithium-ion battery cathodes", *Electrochemistry Communications* 12, 1154-1157 (2010)

[4] A. M. Glushenkov, V. I. Stukachev, M. F. Hassan, G. G. Kuvshinov H. K. Liu, Y. Chen, "A Novel Approach for Real Mass Transformation from $V_2O_5$ Particles to Nanoros" *Cryst Growth Des*, 8, 3661-3665 (2008)

[5] Y. Sakurai, T. Hirai, S. Okada, T. Okada, J. Yamaki, H. Ohtsuka, "Lithium Battery Including Vanadium Pentoxide Base Amorphous Cathode Active Material", U.S. Pat. No. 4,675,260 (1987)

[6] Y. Lee, J-H. Lee, S-H Hong, Y. Park, "Li-ion conductivity in Li2O—B2O3-$V_2O_5$ glass system", *Solid State Ionics* 175, 687-690 (2004)

[7] S. A. Kulieva, P. F. Rza-Zade, K. L. Ganf, and N. P. Luzhnaya, "$Li_2O$—$B_2O_3$—$V_2O_5$", *Izv. Akad. Nauk SSSR, Neorg. Mater.*, 10 [11]2013-2016 (1974); *Inorg. Mater.* (*Engl. Transl.*), 10 [11]1727-1729 (1974)

[8] G. D. Khattak, A. Mekki, "Structure and electrical properties of SrO-borovanadate $(V_2O_5)_{0.5}(SrO)_{0.5-y}(B_2O_3)_y$ glasses, *Journal of Physics and Chemistry of Solids*, 70, 1330-1336 (2009)

[9] V. Kundu, R. L. Dhiman, A. S. Maan, D. R. Goyal, "Structural and Physical Properties of $Fe_2O_3$—$B_2O_3$—$V_2O_5$ Glasses", *Advances in Condensed Matter Physics*, Volume 2008, ID 937054, (2008)

The invention claimed is:

1. A glass having a composition $(V_2O_5)_z$-$(M_uO_v)_w$—$(LiBO_2)_t$, wherein
$M_uO_v$ is selected from the group consisting of NiO, $Co_3O_4$, $Na_2O$, $Al_2O_3$, MnO, $MnO_2$, $CrO_3$, CuO, $Ni_2O_3$, $Fe_2O_3$, $TiO_2$, and mixtures thereof,
where u and v are stoichiometric coefficients resulting in a neutral compound such that u=2v/(oxidation state of M),
where z, w, and t are weight-% of $(V_2O_5)$, $(M_uO_v)$, and $(LiBO_2)$ in the composition, respectively, wherein:
z is a number from 70-80,
w is a number greater than zero and up to 20,
t is a number from 10-30, and
a sum of z, w, and t equal to 100 weight-%.

2. The glass of claim 1, wherein z is about 80, w is about 5, and t is about 15.

3. The glass of claim 1, wherein w is at least 1.

4. The glass of claim 3, wherein the composition is nitrogen-doped.

5. The glass of claim 1, wherein $M_uO_v$ is NiO.

6. The glass of claim 2, wherein $M_uO_v$ is NiO.

7. The glass of claim 3, wherein $M_uO_v$ is NiO.

8. The glass of claim 1, wherein $M_uO_v$ is $Na_2O$ and/or $Al_2O_3$.

9. The glass of claim 2, wherein $M_uO_v$ is $Na_2O$ and/or $Al_2O_3$.

10. The glass of claim 3, wherein $M_uO_v$ is $Na_2O$ and/or $Al_2O_3$.

11. The glass of claim 1, the glass being enriched with Li due to doping with $Li_3N$.

12. A composite cathode material, comprising a glass of claim 1 together with carbon and/or graphite, the carbon and/or graphite obtained by reduction of graphite oxide.

13. A composite cathode material, comprising the glass of claim 5 together with carbon and/or graphite, the carbon and/or graphite obtained by reduction of graphite oxide.

14. A composite cathode material, comprising the glass of claim 8 together with carbon and/or graphite, the carbon and/or graphite obtained by reduction of graphite oxide.

15. A cathode, comprising the glass of claim 1 disposed on a current collector.

16. A cathode, comprising the composite cathode material of claim 12 disposed on a current collector.

17. A rechargeable battery, comprising the cathode of claim 15, an anode, a diaphragm, and an electrolyte.

18. A rechargeable battery, comprising the cathode of claim 16, an anode, a diaphragm, and an electrolyte.

19. A method for producing a glass of claim 1, comprising:
providing a composition of $(V_2O_5)_z$-$(M_uO_v)_w$—$(LiBO_2)_t$ by mixing and grinding of z wt-% of $V_2O_5$, w wt-% of $(M_uO_v)$, and t wt-% $LiBO_2$;
heating the mixture to a temperature and for a time to form a homogenous melt, but not over 900° C.; and
quenching the heated mixture.

20. A method for producing a glass of claim 5, comprising:
providing a composition of $(V_2O_5)_z$-$(M_uO_v)_w$—$(LiBO_2)_t$ by mixing and grinding of z wt-% of $V_2O_5$, w wt-% of $M_uO_v$, and t wt-% $LiBO_2$;
heating the mixture to a temperature and for a time to form a homogenous melt, but not over 900° C.; and
quenching the heated mixture.

21. A method for producing a glass of claim 8, comprising:
providing a composition of $(V_2O_5)_z$-$(M_uO_v)_w$—$(LiBO_2)_t$ by mixing and grinding of z wt-% of $V_2O_5$, w wt-% $M_uO_v$, and t wt-% $LiBO_2$;
heating the mixture to a temperature and for a time to form a homogenous melt, but not over 900° C.; and
quenching the heated mixture.

* * * * *